United States Patent
Miyashita

(10) Patent No.: US 8,478,068 B2
(45) Date of Patent: Jul. 2, 2013

(54) IMAGE PROCESSING DEVICE, ELECTRONIC INSTRUMENT, AND INFORMATION STORAGE MEDIUM FOR EVALUATING COMPOSITION OF INPUT IMAGE

(75) Inventor: Naoyuki Miyashita, Tokyo (JP)

(73) Assignee: Olympus Corporation, Tokyo (JP)

( * ) Notice: Subject to any disclaimer, the term of this patent is extended or adjusted under 35 U.S.C. 154(b) by 479 days.

(21) Appl. No.: 12/781,208

(22) Filed: May 17, 2010

(65) Prior Publication Data
US 2010/0290673 A1 Nov. 18, 2010

(30) Foreign Application Priority Data
May 18, 2009 (JP) ................................. 2009-119468

(51) Int. Cl.
G06K 9/36 (2006.01)
G06F 17/00 (2006.01)
H04N 5/228 (2006.01)

(52) U.S. Cl.
USPC .......................... 382/276; 715/243; 348/222.1

(58) Field of Classification Search
None
See application file for complete search history.

(56) References Cited

U.S. PATENT DOCUMENTS

| 7,529,390 | B2 * | 5/2009 | Zhang et al. | 382/118 |
| 8,125,557 | B2 * | 2/2012 | Chen et al. | 348/333.04 |
| 8,132,096 | B1 * | 3/2012 | Widdowson et al. | 715/243 |
| 8,175,343 | B2 | 5/2012 | Tezuka | |
| 2002/0191861 | A1 * | 12/2002 | Cheatle | 382/282 |
| 2003/0152291 | A1 * | 8/2003 | Cheatle | 382/296 |
| 2005/0100319 | A1 * | 5/2005 | Saed | 386/69 |
| 2005/0147322 | A1 * | 7/2005 | Saed | 382/284 |
| 2006/0008145 | A1 * | 1/2006 | Kaku | 382/173 |
| 2006/0251338 | A1 * | 11/2006 | Gokturk et al. | 382/305 |
| 2007/0076979 | A1 * | 4/2007 | Zhang et al. | 382/282 |
| 2007/0230823 | A1 * | 10/2007 | Weng et al. | 382/286 |
| 2007/0263933 | A1 * | 11/2007 | Ojima et al. | 382/190 |
| 2009/0278958 | A1 * | 11/2009 | Bregman-Amitai et al. | 348/231.99 |
| 2010/0214445 | A1 * | 8/2010 | Chronqvist | 348/231.99 |

FOREIGN PATENT DOCUMENTS

| JP | 2001-167253 A | 6/2001 |
| JP | 2007-295203 A | 11/2007 |
| JP | 2008-042800 A | 2/2008 |
| JP | 2008-219874 A | 9/2008 |

OTHER PUBLICATIONS

Paul Viola et al; Rapid Object Detection Using a Boosted Cascade of Simple Features; Accepted Conference on Computer Vision and Pattern Recognition; 2001; pp. 1-9.

T. Mitsui et al; Human Detection by Two Stages Adaboost With Joint Hog; 14$^{th}$ Symposium on Sensing via Image Information; IN1-06; 2008.

Japanese Office Action dated Feb. 26, 2013 (and English translation thereof) in counterpart Japanese Application No. JP2009-119468.

* cited by examiner

*Primary Examiner* — Wenpeng Chen
(74) *Attorney, Agent, or Firm* — Holtz, Holtz, Goodman & Chick, PC

(57) ABSTRACT

An image processing device includes a weighted image generation section that generates a weighted image in which at least one of an object-of-interest area of an input image and an edge of a background area other than the object-of-interest area is weighted, a composition grid generation section that generates a composition grid that includes grid lines that are weighted, and a composition evaluation section that performs composition evaluation calculations on the input image based on the weighted image and the composition grid.

22 Claims, 23 Drawing Sheets

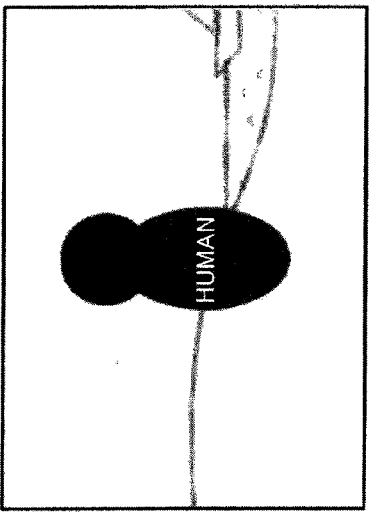
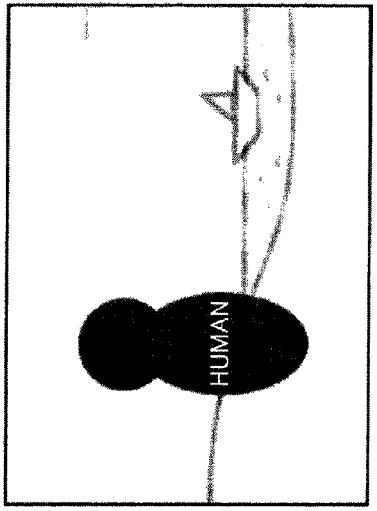
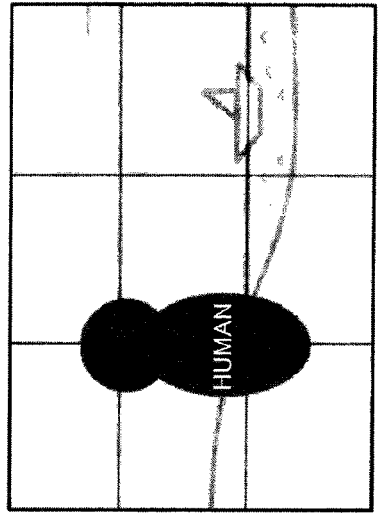

WEIGHTED IMAGE

WEIGHTED IMAGE (BACKGROUND AREA)

LOW WEIGHT

INPUT IMAGE

WEIGHTED IMAGE (HUMAN AREA)

HIGH WEIGHT (BECOMES MAXIMUM AT CENTER)

LOW WEIGHT

COMPOSITION GRID (AFTER WEIGHTING)

COMPOSITION GRID

COMPOSITION GRID (AFTER WEIGHTING)

IMZ

IMZ    IMn

US 8,478,068 B2

IMAGE PROCESSING DEVICE, ELECTRONIC INSTRUMENT, AND INFORMATION STORAGE MEDIUM FOR EVALUATING COMPOSITION OF INPUT IMAGE

Japanese Patent Application No. 2009-119468 filed on May 18, 2009, is hereby incorporated by reference in its entirety.

BACKGROUND

The present invention relates to an image processing device, an electronic instrument, an information storage medium, etc.

A user of a camera generally desires to take a photograph with a better composition.

For example, JP-A-2001-167253 discloses a method that determines the ideality of the composition of the image and presents the determination result to the user. The method disclosed in JP-A-2001-167253 determines the ideality of the composition based on whether or not the object is positioned near the rule-of-thirds line or the intersection point of the rule-of-thirds lines.

JP-A-2007-295203 discloses a method that detects an object of interest (main object) (e.g., human) from the image, trims the image so that the object of interest is positioned at the intersection point of the rule-of-thirds lines, presents four images that are obtained corresponding to the number of intersection points to the user, and allows the user to select the desired image.

JP-A-2008-42800 discloses a method that extracts a human face/body area, a sky area, a vanishing point, and a high intensity area from the image, and trims the image so that at least one of the sky area, the vanishing point, and the high intensity area is included in the image and the human body area is positioned at the intersection point of the rule-of-thirds lines. When a plurality of human objects are detected (e.g., group photograph), the image is trimmed so that the human face is positioned at the center of the image in the horizontal direction.

SUMMARY

According to one aspect of the invention, there is provided an image processing device that evaluates a composition of an input image, the image processing device comprising:

a weighted image generation section that generates a weighted image in which at least one of an object-of-interest area of the input image and an edge of a background area other than the object-of-interest area is weighted;

a composition grid generation section that generates a composition grid that includes grid lines, the grid lines being weighted; and a composition evaluation section that performs composition evaluation calculations on the input image based on the weighted image and the composition grid.

According to another aspect of the invention, there is provided an electronic instrument comprising the above image processing device.

According to another aspect of the invention, there is provided a computer-readable information storage medium storing a program that causes a computer to function as:

a weighted image generation section that generates a weighted image in which at least one of an object-of-interest area of an input image and an edge of a background area other than the object-of-interest area is weighted;

a composition grid generation section that generates a composition grid that includes grid lines, the grid lines being weighted; and a composition evaluation section that performs composition evaluation calculations on the input image based on the weighted image and the composition grid.

BRIEF DESCRIPTION OF THE DRAWINGS

FIGS. 1A to 1C are views illustrative of an ideal composition.

DESCRIPTION OF EXEMPLARY EMBODIMENTS

Embodiments of the invention are described below. Note that the following embodiments do not in any way limit the scope of the invention laid out in the claims. Note also that all elements of the following embodiments should not necessarily be taken as essential requirements for the invention.

1. Configuration Example

The following embodiment illustrates an example in which a rectangular area that provides an ideal composition is determined from an input image, and presented to the user.

The definition of the term "ideal composition" is described below with reference to FIGS. 1A to 1C. A photograph in which the object is shifted from the center of the image (see FIG. 1B) is generally considered to have an ideal composition as compared with a photograph in which the object is positioned at the center of the image (see FIG. 1A). Grid lines shown in FIG. 1C are normally used as an index for photographing the object with an ideal composition. Examples of the grid lines include rule-of-thirds lines that vertically and horizontally divide the entire area into three areas, golden section lines that vertically and horizontally divide the entire area in a ratio of about 1:1.62, and the like. The ideal composition may be obtained by positioning the object of interest or the edge of the background at the intersection point of the grid lines or on the grid line. In this embodiment, the ideality of the composition of the input image is evaluated by utilizing the grid lines. A rectangular area within the image that provides the ideal composition is calculated, and presented to the user.

Figure 2:
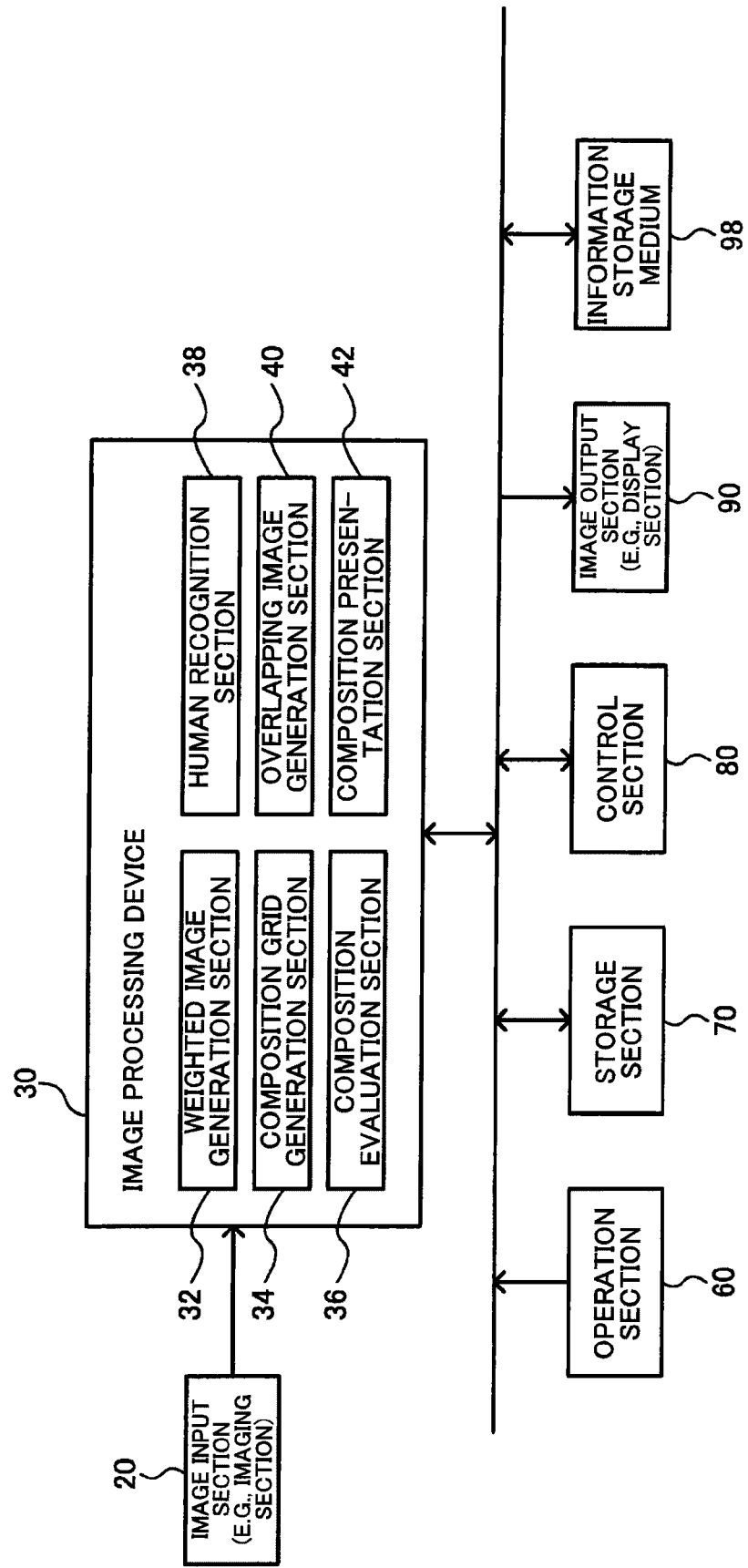
FIG. 2 shows a configuration example of an image processing device and an electronic instrument according to one embodiment of the invention.

FIG. 2 shows a configuration example of an image processing device 30 according to this embodiment, and an electronic instrument that includes the image processing device 30. The electronic instrument shown in FIG. 2 includes an image input section 20, the image processing device 30, an operation section 60, a storage section 70, a control section 80, an image output section 90, and an information storage medium 98. Note that various modifications may be made, such as omitting some of these elements or adding other elements.

The electronic instrument shown in FIG. 2 may be an electronic camera such as a digital camera or a video camera. Note that this embodiment is not limited to an electronic camera, but may also be applied to various electronic instruments such as a computer, a portable information terminal, a mobile phone, and a portable game machine. For example, an image processing method according to this embodiment may be implemented by a program stored in a personal computer, and composition evaluation calculations may be performed using image data stored in a storage section of the personal computer.

The image input section 20 (image acquisition section) inputs (acquires) a processing target image. The image input section 20 may be implemented by an imaging section included in an electronic camera, or the like. The imaging section may be implemented by an imaging element (e.g., CCD or CMOS sensor). The image input section 20 may also be implemented by a communication section that receives image data from the outside via wireless or cable communication, or an external interface that performs a memory card or USB interface process.

The image processing device 30 performs various processes according to this embodiment. The image processing device 30 may be implemented by an image processing IC, a combination of a processor (CPU) and software, or the like. The image processing device 30 according to this embodiment evaluates the composition of the input image, for example.

The operation section 60 is implemented by a shutter release button, an operation button, a dial, and the like when the electronic instrument is an electronic camera. Note that the function of the operation section 60 may be implemented by a touch panel display.

The storage section 70 serves as a work area for the image processing device 30 and the control section 80. The storage section 70 stores data such as image data. The function of the storage section 70 may be implemented by a RAM, a hard disk drive (HDD), or the like.

The control section 80 (control device) controls the entire device. The control section 80 may be implemented by an ASIC, a processor (e.g., microcomputer), or the like.

The image output section 90 outputs the processed image. The image output section 90 may be implemented by a display section included in an electronic camera, or the like. The display section is implemented by an electro-optical panel (e.g., liquid crystal panel or organic EL panel) or the like, and displays a frame image (e.g., see-through image).

The information storage medium 98 (computer-readable medium) stores a program, data, and the like. The function of the information storage medium 98 may be implemented by a memory card, an HDD, an optical disk (CD or DVD), a memory (e.g., ROM), or the like. The image processing device 30 and the control section 80 perform various processes according to this embodiment based on a program (data) stored in the information storage medium 98. Specifically, the information storage medium 98 stores a program that causes a computer (i.e., a device that includes an operation section, a processing section, a storage section, and an output section) to function as each section according to this embodiment (i.e., a program that causes a computer to execute the process of each section).

The image processing device 30 includes a weighted image generation section 32, a composition grid generation section 34, a composition evaluation section 36, a human recognition section 38, an overlapping image generation section 40, and a composition presentation section 42. Note that various modifications may be made, such as omitting some (e.g., human recognition section, overlapping image generation section, or composition presentation section) of these elements or adding other elements.

The weighted image generation section 32 generates a weighted image. The data of the generated weighted image is stored in the storage section 70.

Specifically, the weighted image generation section 32 generates a weighted image in which an object-of-interest area (i.e., an area of the main object (e.g., human or animal)) within the input image or the edge (boundary) of a background area other than the object-of-interest area (i.e., an area of the background object other than the object of interest) are weighed. For example, the weighted image generation section 32 generates the weighted image in which a weighting value (weighting coefficient or weighting pixel value) is set for each dot (each pixel) of the object-of-interest area and each dot of the edge (and its periphery) of the background area.

When the object of interest (e.g., human) is not present (e.g., landscape photograph), the weighting value may be set for only the background area. Alternatively, the weighting value may be set for only the object-of-interest area without setting the weighting value for the background area.

The weighted image generation section 32 may generate the weighted image in which the object-of-interest area is weighted higher than the edge of the background area. For example, the weighted image generation section 32 generates the weighted image so that a weighting value WPS (e.g., average value or representative value) set for the object-of-interest area is larger than a weighting value WBK (average value or representative value) set for the edge of the background area. Note that the weighted image generation section 32 may generate the weighted image so that the weighting value WPS is equal to the weighting value WBK.

The weighted image generation section 32 may generate the weighted image in which a human face area is weighted higher than a human body area when the human recognition section 38 has detected a human within the input image. For example, the weighted image generation section 32 generates the weighted image so that a weighting value WFA (average value or representative value) set for the human face area is larger than a weighting value WBD (average value or representative value) set for the human body area. Note that the weighted image generation section 32 may generate the weighted image so that the weighting value WFA is equal to the weighting value WBD.

The weighted image generation section 32 may generate the weighted image in which a higher weight is applied to an area that is positioned closer to the center area of the object-of-interest area. For example, when the object of interest is a human and a human face area has been detected, a larger weighting value is set for an area that is positioned closer to the center area of the human face area, and a smaller weighting value is set for an area that is positioned closer to the edge (boundary) of the human face area. When a human body area has been detected, a larger weighting value is set for an area that is positioned closer to the center area of the human body area, and a smaller weighting value is set for an area that is positioned closer to the edge (boundary) of the human body area. Note that a constant weighting value may be set for the face area and the body area. In this embodiment, the center area need not correspond to the accurate center coordinates of each area, but may be an area that includes the center of each area, for example.

The weighted image generation section 32 may extract the edge of the input image, and smooth the extracted edge to generate the weighted image. For example, the weighted image generation section 32 performs an edge extraction filter process on the input image to extract an edge image, and performs a smoothing filter process on the extracted edge image to generate a weighted image in which the weighting value is set for the edge and its peripheral area.

The composition grid generation section 34 generates a composition grid. The data of the generated composition grid is stored in the storage section 70.

Specifically, the composition grid generation section 34 generates a composition grid in which grid lines (lines and intersection points) are weighted. For example, the composition grid generation section 34 generates a composition grid in which a weighting value (weighting coefficient or weighting pixel value) is set for each dot (each pixel) of the grid lines (and their periphery). The composition grid includes a plurality of grid lines, for example. Specifically, the composition grid includes a first grid line group (e.g., a grid line group that extends in the transverse (horizontal) direction) and a second grid line group (e.g., a grid line group that extends in the vertical direction) that intersects (e.g., perpendicularly intersects) the first grid line group. The weighting value is set for each grid line (and its periphery) of the grid line group.

The composition grid generation section 34 may generate the composition grid in which a higher weight is applied to an area that is positioned closer to the grid line. For example, a larger weighting value is set for an area that is positioned closer to the coordinates of the grid line, and a smaller weighting value is set for an area that is positioned away from the coordinates of the grid line. Note that a constant weighting value may be set for the dots on the grid line and the dots in the peripheral area of the grid line.

The composition grid generation section 34 may generate the composition grid in which the intersection point of the composition grid is weighted higher than the grid line excluding the intersection point. For example, the composition grid generation section 34 generates the composition grid (composition grid weighted image) so that a weighting value WCP (average value or representative value) set for the intersection point of the composition grid (i.e., the intersection point of the grid lines) is larger than a weighting value WLN (average value or representative value) set for the grid line excluding the intersection point. Note that the composition grid generation section 34 may generate the composition grid so that the weighting value WCP is equal to the weighting value WLN.

The composition evaluation section 36 performs composition evaluation calculations. Specifically, the composition evaluation section 36 performs the composition evaluation calculations on the input image based on the weighted image generated by the weighted image generation section 32 and the composition grid generated by the composition grid generation section 34 to calculate a composition evaluation value (ideality or rating of composition). For example, the composition evaluation section 36 performs correlation calculations on the weighted image and the composition grid, and determines (calculates) the correlation value obtained by the correlation calculations to be the composition evaluation value.

The composition evaluation section 36 may calculate the composition evaluation value using the weight applied to the intersection point of the composition grid, and may calculate the composition evaluation value using the weight applied to the grid line on condition that the calculated composition evaluation value is equal to or larger than a given threshold value. The composition evaluation section 36 may calculate the composition evaluation value using the weight applied to the grid line, and may calculate the composition evaluation value using the weight applied to the peripheral area of the grid line on condition that the calculated composition evaluation value is equal to or larger than a given threshold value.

For example, the composition evaluation section 36 does not calculate the composition evaluation value using the weighting value set for the grid line (i.e., the dots of the grid line) when the composition evaluation value calculated using the weighting value set for the intersection point of the composition grid is smaller than a given threshold value (first threshold value). The composition evaluation section 36 calculates the composition evaluation value using the weighting value set for the grid line when the composition evaluation value calculated using the weighting value set for the intersection point is equal to or larger than the given threshold value.

The composition evaluation section 36 does not calculate the composition evaluation value using the weighting value set for the peripheral area of the grid line (i.e., the peripheral dots of the dots of the grid line) when the composition evaluation value calculated using the weighting value set for the grid line is smaller than a given threshold value (second threshold value). The composition evaluation section 36 calculates the composition evaluation value using the weighting value set for the peripheral area of the grid line when the composition evaluation value calculated using the weighting value set for the grid line is equal to or larger than the given threshold value. This prevents a situation in which unnecessary processes are performed, so that the overall process speed can be increased.

The composition evaluation section 36 may set one of a plurality of (e.g., four) intersection points of the composition grid within the center area of a detected human face area when a human face area has been detected within the input image, and calculate the composition evaluation value. Specifically, the composition evaluation section 36 calculates the composition evaluation value so that the intersection point of the composition grid is positioned at the center of the human face area. Alternatively, the composition evaluation section 36 may set the size of the composition grid based on the size of the detected human face area. For example, the composition evaluation section 36 increases the size of the composition grid when the detected human face area is large, and decreases the size of the composition grid when the detected human face area is small.

The composition evaluation section 36 may calculate the composition evaluation value while rotating the composition grid to find (search) the rotation angle of the composition grid at which a larger composition evaluation value is calculated. For example, the composition evaluation section 36 calculates the composition evaluation value while rotating the composition grid by a rotation angle within an arbitrary angular range to determine the rotation angle at which the composition evaluation value becomes a maximum, and determines the rotation angle to be the rotation angle of the composition grid. In this case, the composition evaluation section 36 determines the intersection point of the composition grid at which the correlation value of the weighted image and the composition grid becomes a maximum (i.e., the intersection point at which the composition evaluation value becomes a maximum) from the plurality of intersection points of the composition grid. The composition evaluation section 36 rotates the composition grid around the determined intersection point to find the rotation angle of the composition grid at which a larger composition evaluation value is calculated.

Alternatively, the composition evaluation section 36 may calculate the composition evaluation value while changing the size of the composition grid to find the size of the composition grid at which a larger composition evaluation value is calculated. For example, the composition evaluation section 36 calculates the composition evaluation value while changing the size of the composition grid within an arbitrary size range to determine the size at which the composition evaluation value becomes a maximum, and determines the size to be the size of the composition grid. In this case, the composition evaluation section 36 determines the intersection point of the composition grid at which the correlation value of the weighted image and the composition grid becomes a maximum (i.e., the intersection point at which the composition evaluation value becomes a maximum) to be the size change center point from the plurality of intersection points of the composition grid, and changes the size of the composition grid with respect to the size change center point. The composition evaluation section 36 thus finds the size of the composition grid at which a larger composition evaluation value is calculated.

The human recognition section 38 performs a human recognition process. Specifically, the human recognition section 38 detects a human area within the input image via image recognition. Examples of a human face area extraction method include the Viola-Jones method utilizing Haar-like features and AdaBoost learning disclosed in "Paul Viola and Michael Jones, "Rapid Object Detection using a Boosted Cascade of Simple Features", CVPR 2001". Examples of a human area extraction method include the method disclosed in "Tomokazu Mitsui, Yuji Yamauchi, and Hironobu Fujiyoshi, "Human Detection by Two Stages AdaBoost with Joint HOG", the 14th Symposium on Sensing via Image Information, IN1-06, 2008".

The overlapping image generation section 40 generates an overlapping image. For example, the overlapping image generation section 40 overlapping first to nth frame images that have been input to generate an overlapping image. The composition evaluation section 36 performs the composition evaluation calculations based on a weighted image generated from the overlapping image and the composition grid. Specifically, the weighted image generation section 32 generates a weighted image from the overlapping image, and the composition evaluation section 36 performs the correlation calculations on the weighted image generated from the overlapping image and the composition grid to calculate the composition evaluation value. An arbitrary rectangular area within the overlapping image can thus be extracted as a candidate for the ideal composition.

The composition presentation section 42 presents a composition (composition candidate) to the user. For example, the composition presentation section 42 determines the ideal composition of the input image based on the result (composition evaluation value) of the composition evaluation calculations using the weighted image and the composition grid, and presents the determined composition to the user. For example, the composition presentation section 42 determines the rectangular area of the weighted image enclosed by the composition grid to be the ideal composition of the input image, and presents the position of the ideal composition to the user, or trims the rectangular area of the composition. For example, the composition presentation section 42 generates an image that indicates the rectangular area of the optimum composition, and presents the generated image to the user.

The composition presentation section 42 may present the result of the composition evaluation calculations using the weighted image and the composition grid to the user using at least one of a character, a graph, and an image effect. Specifically, the composition presentation section 42 visually presents the ideality of the composition to the user using a character, a graph, an image effect, or the like.

2. Method According to This Embodiment 2.1 Overall Process

Figure 3:
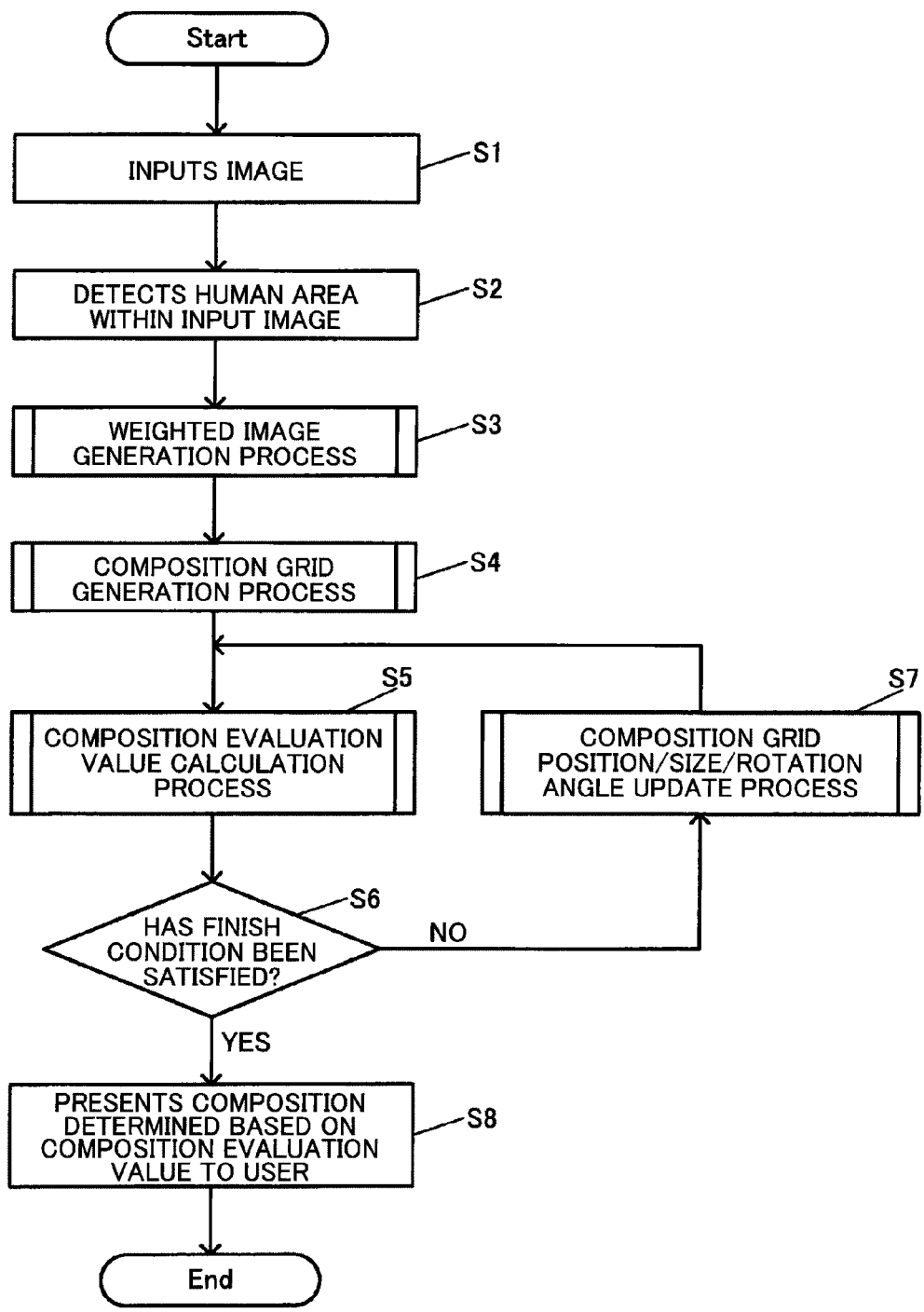
FIG. 3 is a flowchart illustrative of a process according to one embodiment of the invention.

A detailed example of the method according to this embodiment is described below. FIG. 3 is a flowchart showing the flow of the overall process according to this embodiment.

An image is input from the image input section 20 (e.g., imaging section) (step S1), and the data of the input image is transmitted to the storage section 70. Note that the data of the input image may be image data of a see-through image of a digital camera in a standby state, or may be the data of an image photographed by the user.

The human recognition section 38 then detects a human area within the input image via image recognition (step S2). The weighted image generation section 32 generates the weighted image (step S3). The composition grid generation section 34 generates the composition grid (step S4).

The composition evaluation section 36 calculates the composition evaluation value using the weighted image generated in the step S3 and the composition grid generated in the step S4 (step S5). The composition evaluation section 36 determines whether or not a finish condition has been satisfied (step S6). The composition evaluation section 36 updates (changes) the position/size/rotation angle of the composition grid when the finish condition has not been satisfied (step S7). The composition evaluation section 36 then calculates the composition evaluation value using the weighted image and the composition grid for which the position/size/rotation angle has been updated (step S5). When the finish condition has been satisfied in the step S6, the composition determined based on the composition evaluation value is presented to the user (step S8).

2.2 Weighted Image Generation Process

The details of the weighted image generation process (step S3 in FIG. 3) are described below with reference to a flowchart shown in FIG. 4.

Figure 4:
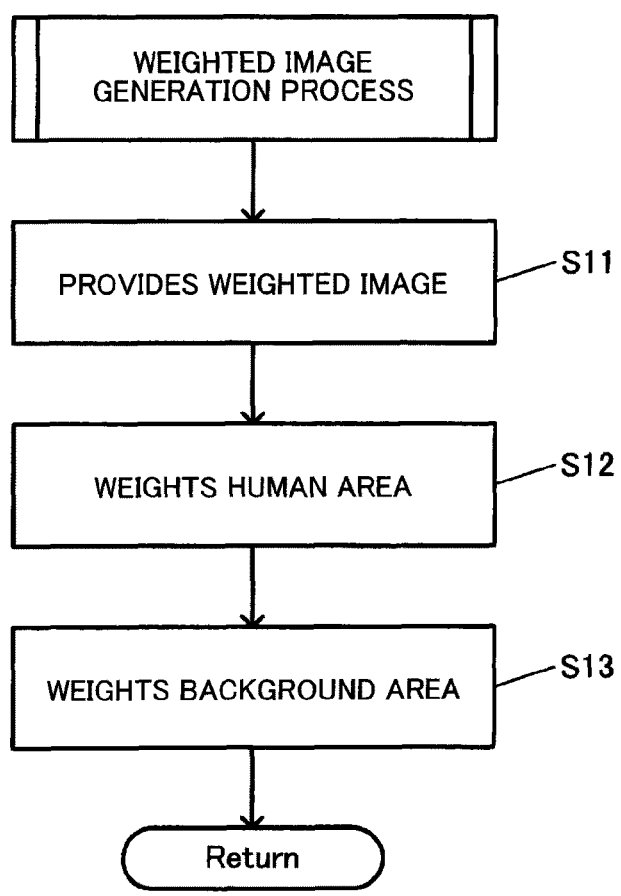
FIG. 4 is a flowchart illustrative of a weighted image generation process.

As shown in FIG. 4, a weighted image is provided (step S11). An area of the weighted image that corresponds to the human area of the input image is weighted (step S12). An area of the weighted image that corresponds to the background area of the input image is also weighted (step S13).

Figure 5D:
FIGS. 5A to 5D are views illustrative of a weighted image.
Figure 5C:
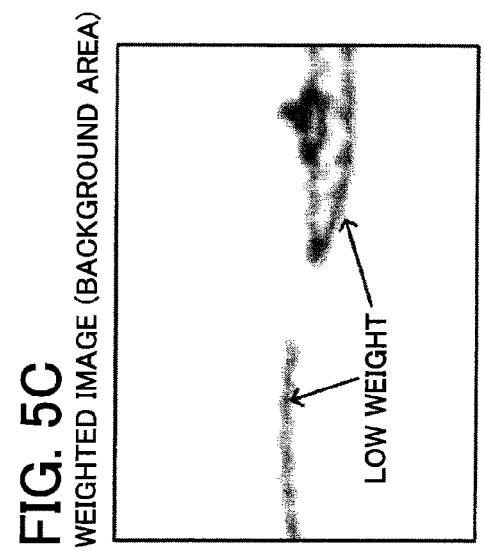
Figure 5A:
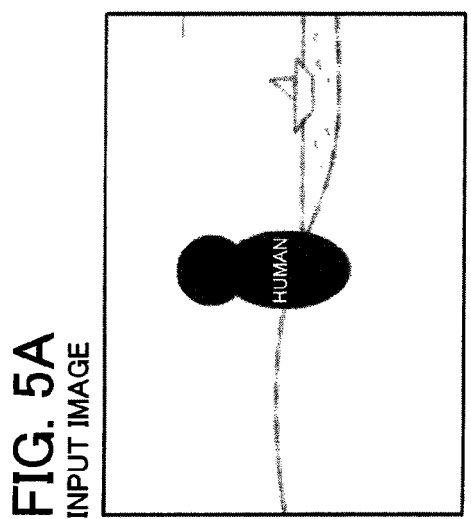
Figure 5B:
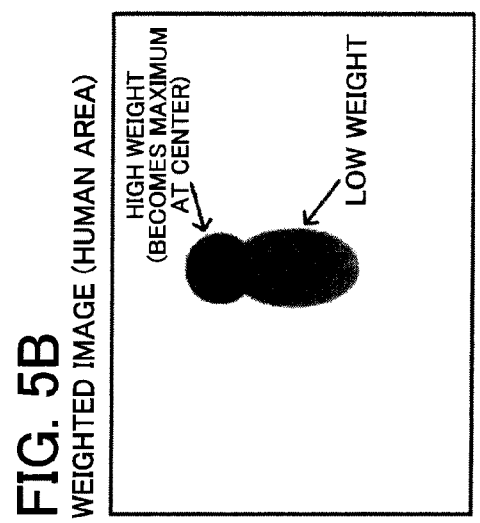

FIGS. 5A to 5D show examples of the input image and the weighted image that corresponds to the input image. As shown in FIGS. 5B to 5D, the weighted image is a coefficient map that has the same positional relationship (i.e., the positional relationship between the objects (e.g., human and background)) as that of the input image shown in FIG. 5A. The weighted image has the same positional relationship as that of the input image, but need not necessarily have the same resolution (number of pixels) as that of the input image. Note that all of the weighting values (coefficient values) of the weighted image are initially set to zero.

FIG. 5B shows an example of the weighted image in which the human area (object-of-interest area in a broad sense) of the input image is weighted. The weighted image shown in FIG. 5B may be generated by specifying the human area within the input image shown in FIG. 5A, and setting the weighting value for the specified human area, for example. The human area is the area detected in the step S2 in FIG. 3. For example, the face area and the body area are separately defined.

In FIG. 5B, the face area is weighted higher than the body area (i.e., the weighting value set for the face area is larger than the weighting value set for the body area). In the face area and the body area, a larger weighting value is set for an area that is positioned closer the center area. For example, the weighting value becomes a maximum in the center area. Such weighting may be implemented by utilizing a Gaussian function (blur function) that has a vertex at the center coordinates of each area, for example. Specifically, an image in which a given weighting value (e.g., 255) is set for the human area (the weighting value set for the area other than the human area is zero, for example) is provided. The image is then subjected to a Gaussian filter process to obtain a weighted image in which a larger weighting value is set for an area that is positioned closer to the center area of each area, and a smaller weighting value is set for an area that is positioned away from the center area of each area.

FIG. 5C shows an example of the weighted image in which the background area (i.e., an area of a background object other than a human) of the input image is weighted. Specifically, the edge (boundary) of the background object is extracted. A higher weight is applied to an area that is positioned closer to the edge of the background object, and a lower weight is applied to an area that is positioned away from the edge of the background object. This may be implemented by extracting the edge from the background area using a Sobel filter, and subjecting the extracted edge to a smoothing filter process, for example. The accuracy may be improved by extracting the edge after integrating the pixel areas based on color/texture information or the like. For example, areas having a similar color or texture are integrated, and the edge of the integrated area is extracted. In this case, the edge between the unintegrated areas is not extracted, but only the edge of the integrated area is extracted. This prevents a situation in which unnecessary edge is extracted.

The final weighted image shown in FIG. 5D can be generated by superimposing the human area weighted image shown in FIG. 5B on the background area weighted image shown in FIG. 5C. In FIGS. 5B to 5D, the human area (object-of-interest area) is weighted higher than the background area. This makes it possible to implement composition evaluation calculations that give priority to the human area.

2.3 Composition Grid Generation Process

The details of the composition grid generation process (step S4 in FIG. 3) are described below using a flowchart shown in FIG. 6.

Figure 6:
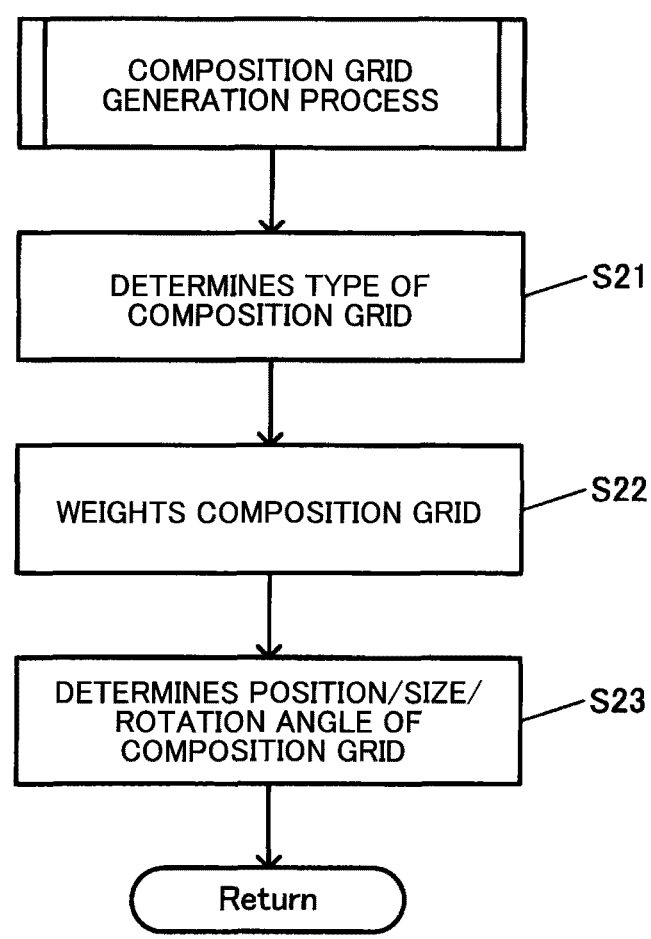
FIG. 6 is a flowchart illustrative of a composition grid generation process.

As shown in FIG. 6, the type of composition grid is determined (step S21). The composition grid is weighted (step S22). The position/size/rotation angle of the composition grid is determined (step S23).

Figure 7B:
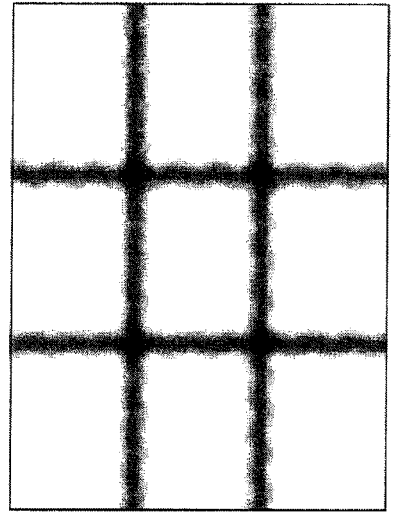
FIGS. 7A to 7C are views illustrative of a composition grid.
Figure 7A:
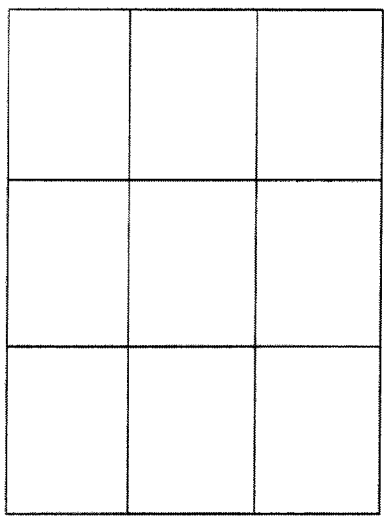
Figure 7C:

FIGS. 7A to 7C show examples of the composition grid. The composition grid is a weighting coefficient map having a size equal to or less than the size of the input image, and includes a plurality of line segments (grid lines). Examples of the line segments of the composition grid include rule-of-thirds lines and golden section lines that are normally utilized to determine the composition of a photograph. In the composition grid shown in FIG. 7A, the grid lines are set so that the entire area is vertically and horizontally divided into three areas. The type of composition grid (e.g., rule-of-thirds lines, golden section lines, or grid lines arbitrarily set by the user) is determined in the step S21 in FIG. 6.

In the step S22 in FIG. 6, the composition grid is weighted along the grid lines. Specifically, a higher weight is applied to an area that is positioned closer to the grid line, and a lower weight is applied to an area that is positioned away from the grid line. The intersection point of the composition grid is weighted higher than the grid line excluding the intersection point. The composition grid shown in FIG. 7B is thus generated.

FIG. 7C three-dimensionally shows the magnitude of the weighting value at each coordinate. As shown in FIG. 7C, a smaller weighting value is set for an area that is positioned away from the dot on the grid line. The weighting value set for the intersection point of the composition grid is larger than the weighting value set for the grid line.

The composition grid may be weighted by weighting the composition grid along the grid line using a Gaussian function, or weighting the composition grid along the grid line and subjecting the composition grid to a smoothing process, in the same manner as the weighted image. Specifically, an image in which a given weighting value is set for the grid line (i.e., the area of the grid line) is generated. For example, an image in which a large weighting value is set for the intersection point of the composition grid and a small weighting value is set for the grid line excluding the intersection point, is generated. The resulting image is subjected to a Gaussian filter process. A composition grid is thus generated so that the weighting value becomes a maximum on the grid line, and decreases as the distance from the dot on the grid line increases, and the weighting value set for the intersection point is larger than the weighting value set for the grid line excluding the intersection point.

In the step S23 in FIG. 6, the position/size/rotation angle of the composition grid is determined Note the position/size/rotation angle of the composition grid indicates the relationship between the composition grid and the weighted image when superimposing the composition grid on the weighted image. In this embodiment, the initial value of the position of the composition grid is the origin (X=0, Y=0) of the weighted image, the initial value of the size of the composition grid is the same as the size of the weighted image, and the initial value of the rotation angle of the composition grid is 0°.

2.4 Composition Evaluation Value Calculation Process, etc.

A detailed process example of the steps S5 to S8 in FIG. 3 is described below.

In the step S5 in FIG. 3, the composition evaluation value is calculated. The composition evaluation value calculation process (composition evaluation calculations in a broad sense) refers to a process that calculates the ideality of the composition utilizing the weighted image and the composition grid. The term "ideality of the composition" refers to the ideality of a rectangular area of the input image that corresponds to the rectangular area in which the composition grid is superimposed on the weighted image.

Figure 8:
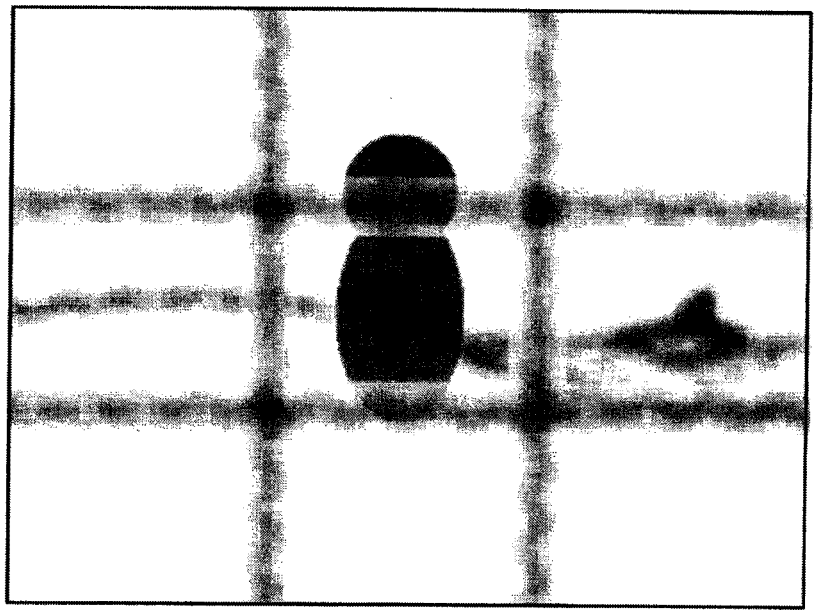
FIG. 8 shows a state in which a composition grid is superimposed on a weighted image.

FIG. 8 shows a state in which the composition grid is superimposed on the weighted image at the position/size/rotation angle determined in the step S23 in FIG. 6. The composition evaluation value (ideality of composition) is obtained by calculating the correlation value of the weighted image and the composition grid at this position/size/rotation angle. The correlation value may be calculated by various methods (refer to "Digital Image Processing", CG-ARTS Society, page 203, for example). In this embodiment, the sum of the squares of the differences (SSD) shown by the following expression (1) is utilized.

$$R_{SSD} = \sum_{j=0}^{N-1} \sum_{i=0}^{M-1} (W(i, j) - G(i - j))^2 \quad (1)$$

In the expression (1), the size of the composition grid is expressed by M×N (M×N dots). The weighting value at the coordinates (i, j) of the composition grid is expressed by G(i, j), and the weighting value at the coordinates (i, j) of the weighted image on which the composition grid is superimposed is expressed by W(i, j).

According to such correlation calculations, the composition evaluation value (i.e., the correlation value obtained by the correlation calculations) increases (i.e., the ideality of the composition is determined to be higher) as the weighted position of the weighted image is closer to the weighted position of the composition grid. For example, when the intersection point of the composition grid for which a large weighting value is set coincides with the center area of the human face for which a large weighting value is set, the composition evaluation value increases (i.e., the ideality of the composition is determined to be high). When the grid line of the composition grid for which the weighting value is set coincides with the background area for which the weighting value is set, the composition evaluation value increases (i.e., the ideality of the composition is determined to be high). Therefore, the ideality of the composition can be numerically evaluated (determined) by the correlation calculation process. The calculated composition evaluation value is stored in the storage section 70 together with the condition (e.g., position/size/rotation angle).

In the step S6 in FIG. 3, whether or not the result of the composition evaluation value calculation process (i.e., the result of the composition evaluation calculations) satisfies the finish condition is determined. The finish condition is a threshold value of the composition evaluation value, the composition evaluation value calculation count, or the like, and differs depending on the objective. For example, it is determined that the finish condition has been satisfied when the composition evaluation value has become equal to or larger than a given threshold value, or the composition evaluation value calculation count has become equal to or larger than a given number. Alternatively, it may be determined that the finish condition has been satisfied when it has been determined that the composition evaluation value has become an extreme value.

In FIG. 3, the position/size/rotation angle of the composition grid is updated until the finish condition is satisfied (i.e., the process of the steps S5, S6, and S7 is looped (iterative process)). Note that it is possible to employ a modification in which the above iterative process is not performed. For example, when it is desired to calculate only the composition evaluation value of the entire input image (i.e., the composition evaluation value when using a standard composition grid), the process transitions to the step S8 without performing the above iterative process. On the other hand, when specifying an area that provides the ideal composition from the input image while variously changing the position/size/rotation angle of the composition grid, the iterative process (steps S5, S6, and S7) is performed, and the process transitions to the step S8 when the finish condition has been satisfied.

Figure 9:
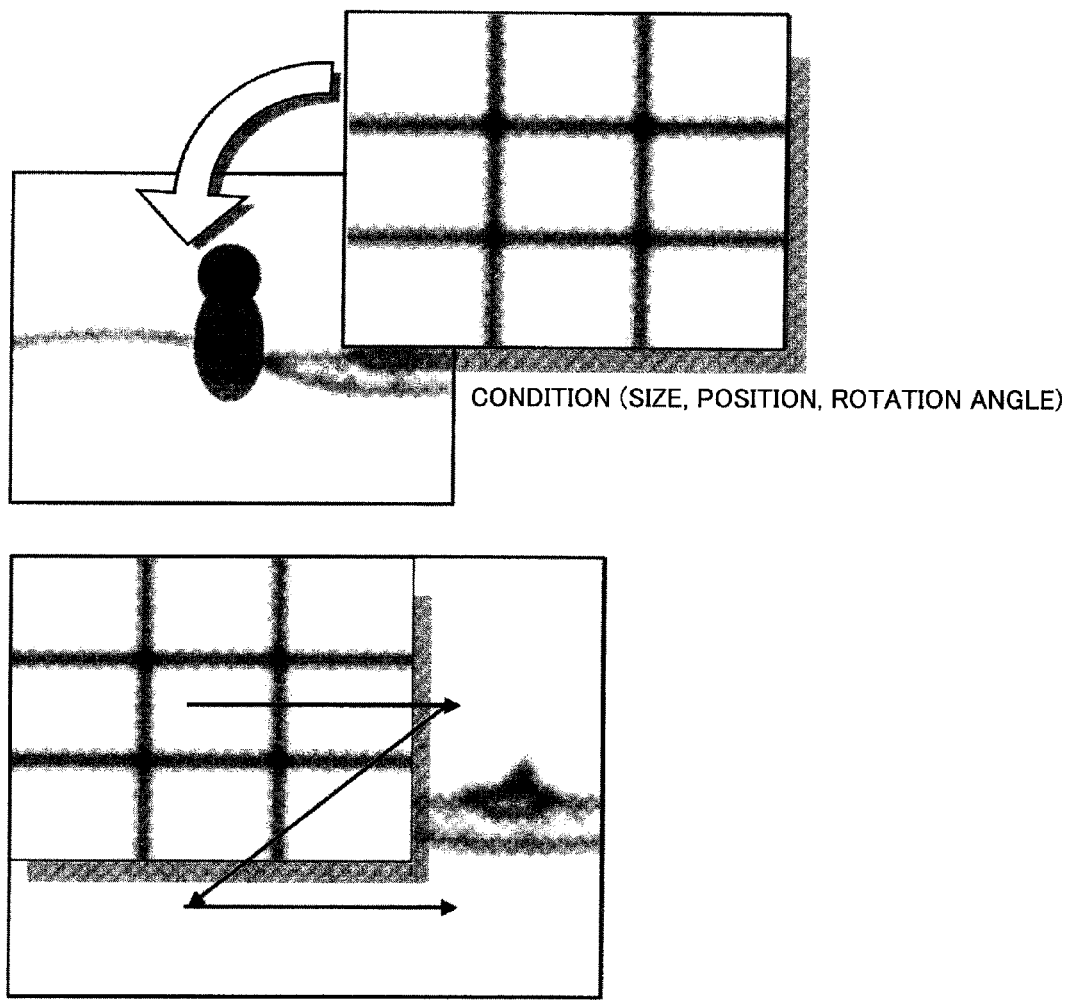
FIG. 9 is a view illustrative of a method of determining the size/position/rotation angle of a composition grid.

In the step S7 in FIG. 3, the position/size/rotation angle of the composition grid is updated. Specifically, the position/size/rotation angle of the composition grid is changed from the preceding position/size/rotation angle, and the composition evaluation value calculation process in the step S5 is again performed. For example, since the position of the composition grid can be changed by reducing the size of the composition grid, the composition evaluation value is then calculated while sequentially changing the position of the composition grid without changing the size of the composition grid. The composition evaluation value under each condition (position/size/rotation angle) of the composition grid is calculated in the same manner as image template matching (refer to "Digital Image Processing", CG-ARTS Society, page 203). FIG. 9 shows such a state.

The iterative process is terminated when the finish condition has been satisfied (e.g., the composition evaluation value equal to or larger than a given threshold value has been calculated, or the composition evaluation value calculation count has become equal to or larger than a given number, or the size of the composition grid has become equal to or smaller than a given size).

Figure 10A:
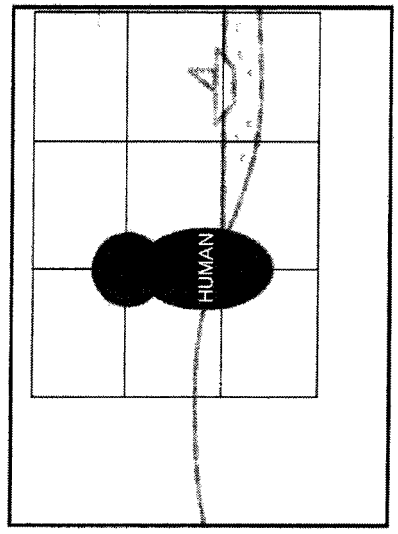
FIGS. 10A to 10C are views illustrative of a method of determining the size/position/rotation angle of a composition grid.
Figure 10B:
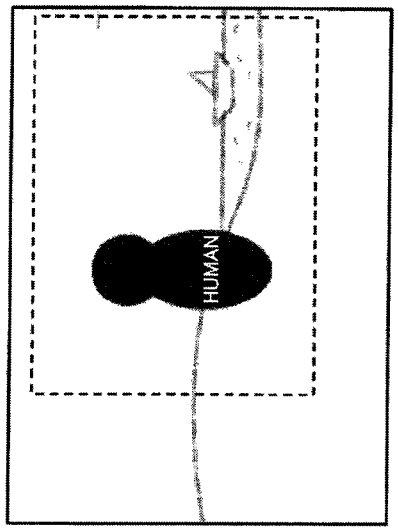
Figure 10C:
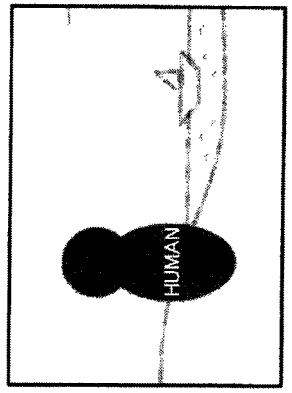

In the step S8 in FIG. 3, the ideal composition determined based on the calculated composition evaluation value is presented to the user. Specifically, the composition presentation section 42 reads the calculated composition evaluation value and the condition (position/size/rotation angle) that corresponds to the composition evaluation value from the storage section 70. For example, when the composition evaluation value becomes a maximum at the position/size/rotation angle of the composition grid shown in FIG. 10A, the composition presentation section 42 generates an image that shows the most ideal composition position (see FIGS. 10B and 10C). The generated image is transmitted to the image output section 90, and displayed on a display section (display) included in a camera, for example. Alternatively, the composition presentation section 42 may transmit (store) the generated image shown in FIGS. 10B and 10C to (in) the storage section 70.

Although an example that utilizes the rule-of-thirds lines as the composition grid has been described above, an arbitrary grid defined by the user may also be utilized. For example, when defining a composition grid in which the vertical grid line slopes upward, the ideal composition can be calculated from an image that was photographed to look up tall buildings.

According to this embodiment, the composition evaluation calculations are performed using the weighted image in which each area of the input image is weighted and the composition grid in which the grid lines are weighted, and the ideality of the composition of the input image is evaluated. This makes it possible to calculate the ideality of the composition in an arbitrary area of the input image by appropriately setting the position, the size, and the rotation angle of the composition grid, for example. The related art does not disclose a method that gives priority when there are a plurality of composition candidates. According to this embodiment, however, a more ideal composition can be presented to the user by utilizing the composition evaluation value as the ideality of the composition.

Moreover, the ideality of the composition can be obtained as an objective value by calculating the composition evaluation value based on the correlation calculations performed on the weighted image and the composition grid. Therefore, a more ideal composition can be found based on the composition evaluation value, and presented to the user. Moreover, the result of the composition evaluation calculations can be presented to the user using a character, a graph, an image effect, or the like based on the composition evaluation value.

According to this embodiment, it is possible to obtain a composition in which the object-of-interest area and the background area are situated at ideal positions on the grid lines of the composition grid by generating a weighted image in which the object-of-interest area (e.g., human area) and the edge of the background area are weighted, and performing the correlation calculations on the weighted image and the composition grid.

Note that this embodiment may also be applied to a building or landscape image in which a human is not present, for example. According to this embodiment, it is possible to obtain an ideal composition from the information about the background area even if a human is not present in the image.

2.5 Speed-Up Method

A method (speed-up method) that increases the speed (efficiency) of the composition evaluation calculations according to this embodiment is described below. For example, the method described with reference to FIG. 3 calculates the composition evaluation value using the weighted image and the composition grid while thoroughly changing the condition (position/size/rotation angle) of the composition grid. On the other hand, the speed-up method according to this embodiment described below performs calculations while limiting each condition of the composition grid based on information obtained from the input image. Note that the processes other than the composition grid generation process (step S4), the composition evaluation value calculation process (step S5), and the composition grid position/size/rotation angle update process (step S7) shown in FIG. 3 are the same as described above, and description thereof is omitted.

Figure 11:
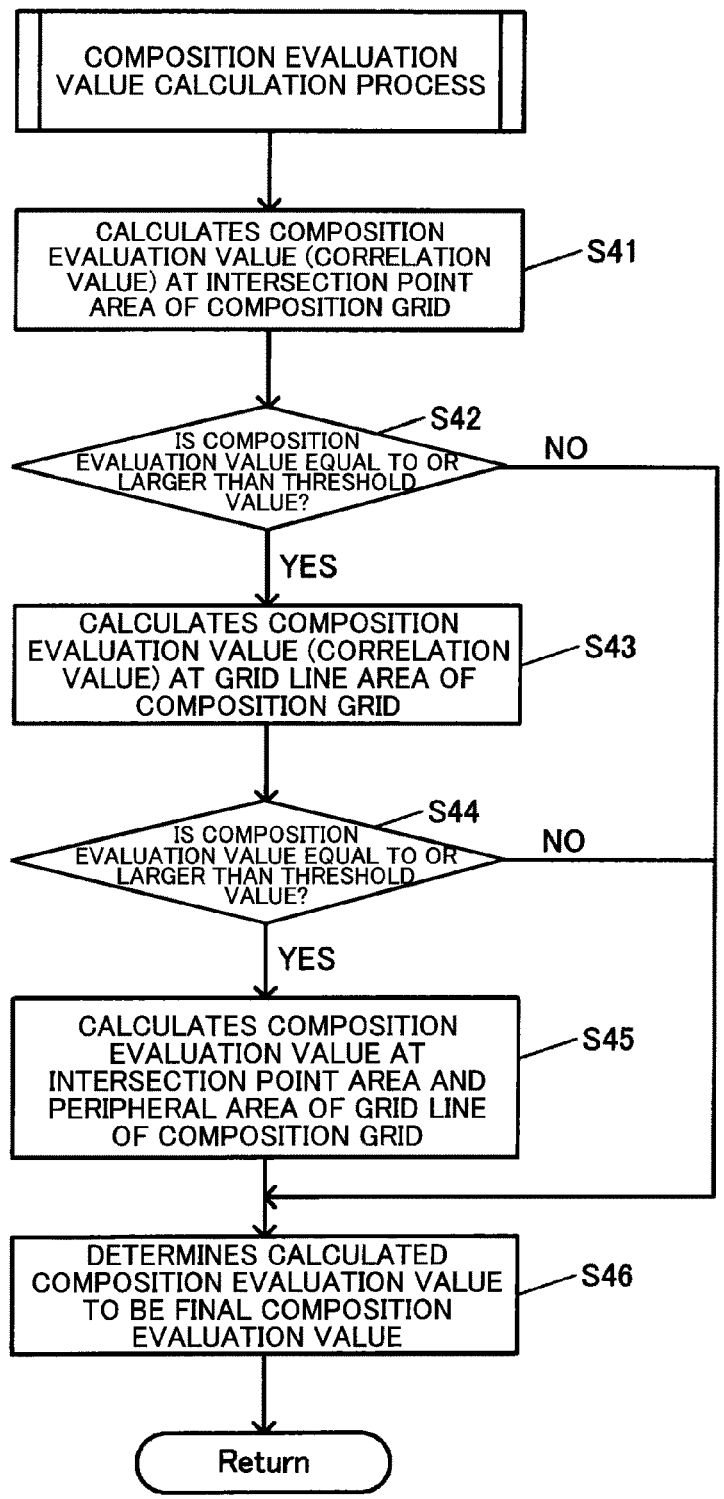
FIG. 11 is a flowchart illustrative of a composition evaluation value calculation process employed in a speed-up method.

FIG. 11 is a flowchart showing the composition evaluation value calculation process employed in the speed-up method according to this embodiment. The flowchart shown in FIG. 11 shows a case where the position/size/rotation angle condition of the composition grid is a given condition.

In a step S41, the correlation calculations are performed on the weighted image only at the intersection point area of the composition grid to calculate the composition evaluation value (correlation value). In a step S42, when it has been determined that the composition evaluation value (correlation value) calculated in the step S41 is equal to or larger than a given threshold value, it is determined that the condition of the composition grid is likely to be an ideal condition, and the process transitions to a step S43. When it has been determined that the composition evaluation value is smaller than the given threshold value, the correlation calculation process is terminated, and the process transitions to a step S46.

In the step S43, the composition evaluation value is calculated at the grid line area of the composition grid. When it has been determined that the composition evaluation value calculated in the step S43 is equal to or larger than the given threshold value in a step S44, the process transitions to a step S45. When it has been determined that the composition evaluation value is smaller than the given threshold value, the correlation calculation process is terminated, and the process transitions to the step S46.

In the step S45, the composition evaluation value is calculated at the intersection point area of the composition grid and the peripheral area of the grid line. Specifically, the composition evaluation value is calculated using the area that is weighted stepwise based on the distance from the grid line (see FIGS. 7B and 7 C). In the step S46, the calculated composition evaluation value is taken as the final composition evaluation value under the current condition.

Specifically, as shown in FIG. 11, the composition evaluation value is calculated in the step S41 using the weight applied to the intersection point of the composition grid. The composition evaluation value is calculated in the step S44 using the weight applied to the grid line on condition that the calculated composition evaluation value is equal to or larger than the given threshold value. The composition evaluation value is calculated in the step S45 using the weight applied to the peripheral area of the grid line on condition that the composition evaluation value calculated in the step S43 is equal to or larger than the given threshold value.

Therefore, the calculation speed can be increased by promptly terminating the process when the composition evaluation value (correlation value) is not likely to reach a large value, and continuing the calculations only when the composition evaluation value (correlation value) is likely to reach a large value.

Figure 12:
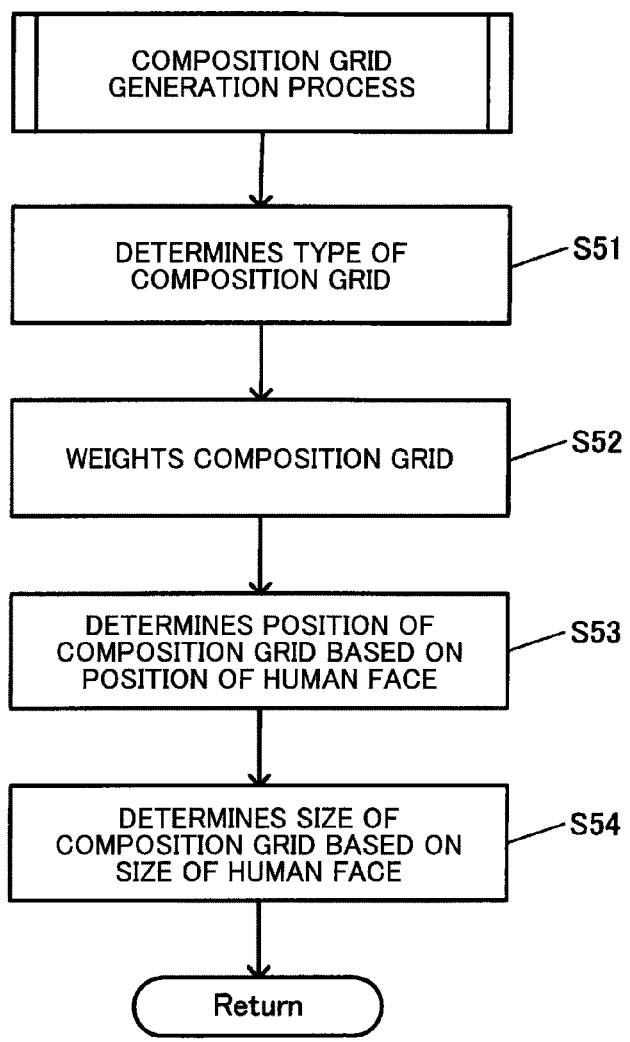
FIG. 12 is a flowchart illustrative of a composition grid generation process employed in a speed-up method

FIG. 12 is a flowchart showing the composition grid generation process employed in the speed-up method according to this embodiment. Steps S51 and S52 are the same as the steps S21 and S22 in FIG. 6. Therefore, description thereof is omitted.

In a step S53 in FIG. 12, the position of the composition grid (i.e., the initial position where the composition grid is superimposed on the weighted image) is determined based on the position of a human face. Specifically, the initial position of the composition grid is determined so that one of the plurality of intersection points of the composition grid coincides with the center area (center coordinates) of the human face. That is, one of the intersection points of the composition grid is positioned within the center area of the detected human face area, and the composition evaluation value is calculated.

Figure 13A:
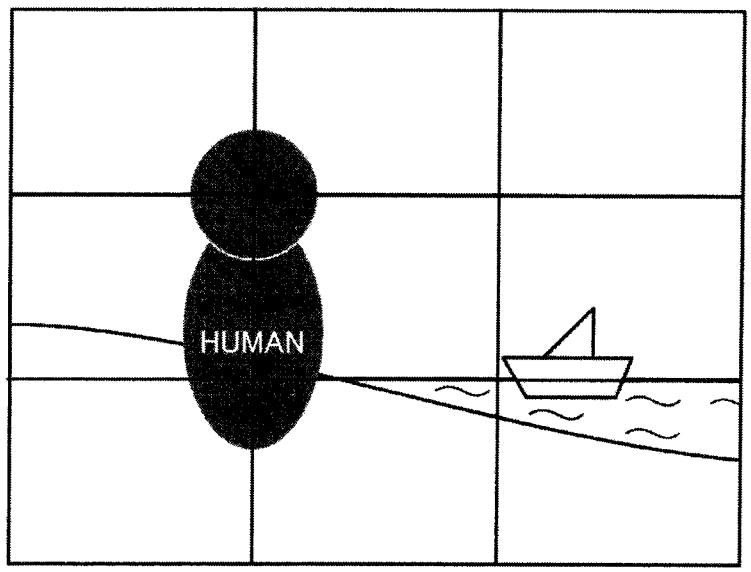
FIGS. 13A and 13B are views illustrative of a method of determining the position of a composition grid based on a human face.
Figure 13B:
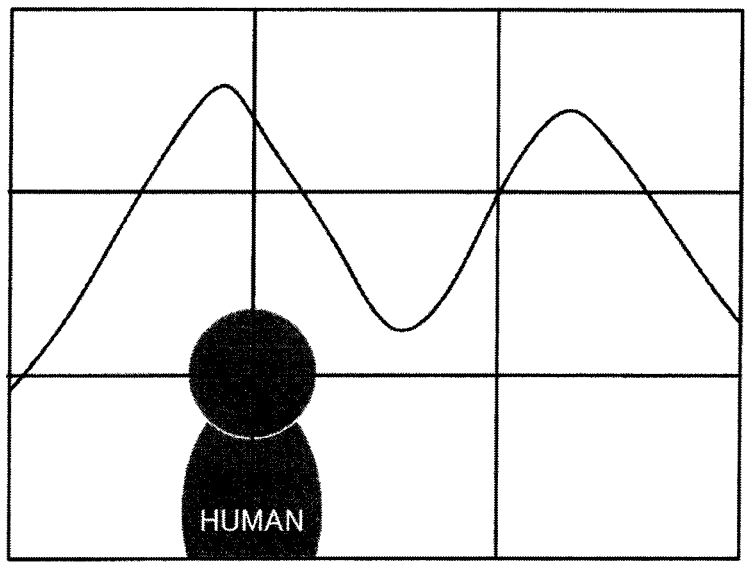

In FIG. 13A, a human face is detected in the upper area of the input image, for example. In this case, the initial position of the composition grid is determined so that one of the upper intersection points of the composition grid is positioned within the center area of the human face. In FIG. 13B, a human face is detected in the lower area of the input image. In this case, the initial position of the composition grid is determined so that one of the lower intersection points of the composition grid is positioned within the center area of the human face.

In a step S54 in FIG. 12, the size of the composition grid is determined based on the size of the human face. Specifically, the size of the composition grid is determined so that the size of the composition grid increases as the area of the input image occupied by the human face increases, and decreases as the area of the input image occupied by the human face decreases. That is, the size of the composition grid is set based on the size of the detected human face.

Figure 14A:
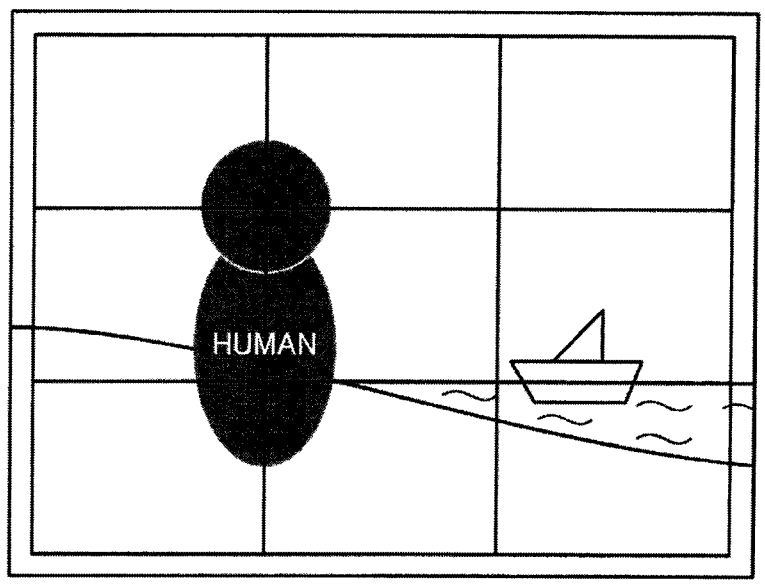
FIGS. 14A and 14B are views illustrative of a method of determining the position of a composition grid based on a human face.
Figure 14B:
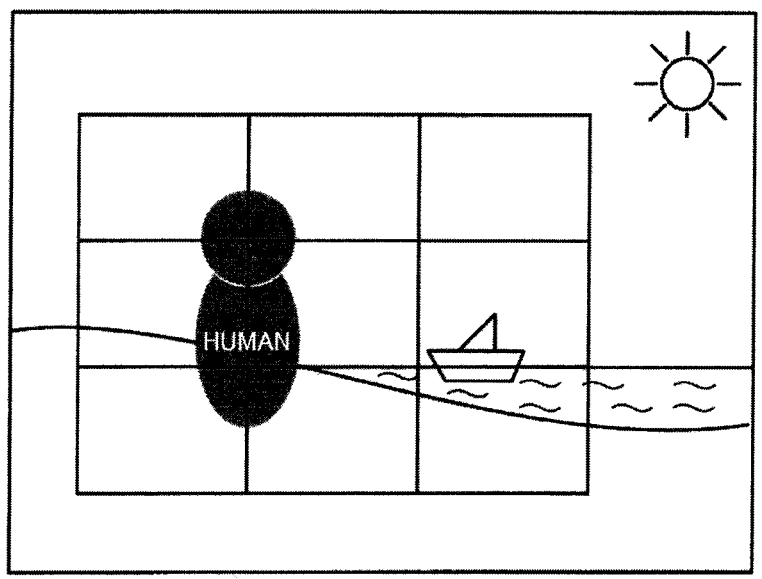

In FIG. 14A, since the human face occupies a large area of the input image, the initial size of the composition grid is increased, for example. In FIG. 14B, since the human face occupies a small area of the input image, the initial size of the composition grid is decreased.

The number of times that the iterative process (steps S5, S6, and S7 in FIG. 3) is performed while updating the condition of the composition grid can be reduced by thus determining the initial position and the initial size of the composition grid (i.e., predetermining the position and the size of the composition grid). This makes it possible to increase the process speed/efficiency.

When a plurality of human faces have been detected (e.g., group photograph), the position of the composition grid may be determined based on the position of the frontmost human face. Specifically, the position of the composition grid is determined so that the intersection point of the composition grid is positioned within the center area of the frontmost human face. It is also possible to deal with such a situation by allowing the user to set the object of interest (described later). The initial rotation angle (angle) of the composition grid is normally set to 0°. When it has been detected that the human face is tilted, the initial rotation angle of the composition grid may be set to the tilt angle.

Figure 15:
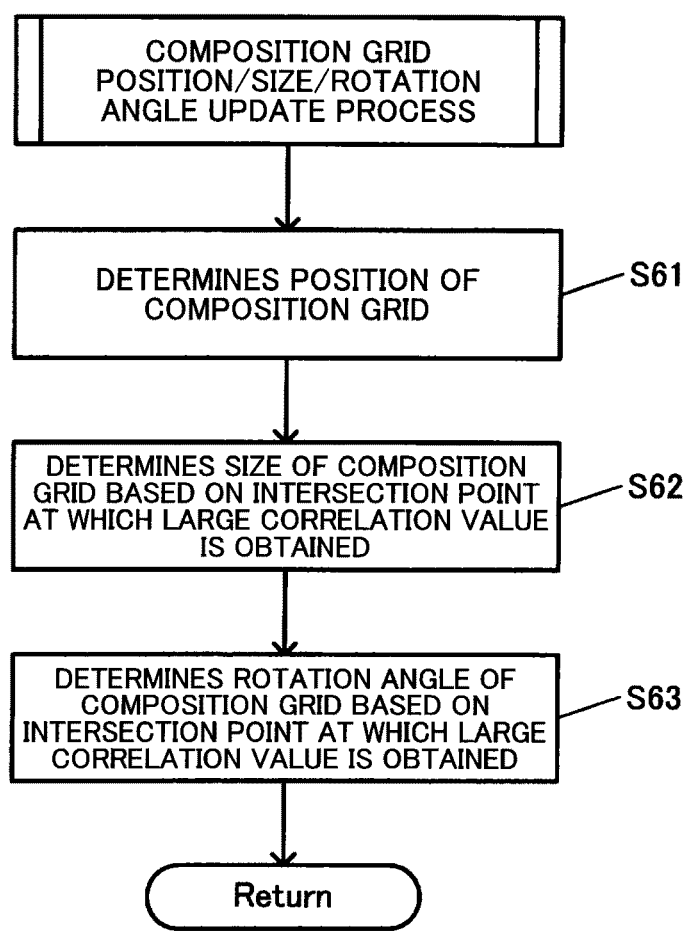
FIG. 15 is a flowchart illustrative of a composition grid position/size/rotation angle update process employed in a speed-up method.

FIG. 15 is a flowchart showing the composition grid position/size/rotation angle update process employed in the speed-up method according to this embodiment.

In a step S61 in FIG. 15, the new position of the composition grid is determined. Since a certain correlation value (composition evaluation value) is expected to be obtained at the initial position that has been set as shown in FIGS. 13A and 13B, only the position around the initial position is determined as the new position in the step S61. Specifically, the above method performs the iterative process (steps S5, S6, and S7 in FIG. 3) while thoroughly changing the position of the composition grid. On the other hand, the speed-up method according to this embodiment performs the iterative process (steps S5, S6, and S7 in FIG. 3) while changing the position of the composition grid only around the initial position shown in FIGS. 13A and 13B. This makes it possible to reduce the number of times that the iterative process is performed, so that the process efficiency can be increased.

In a step S62 in FIG. 15, the size of the composition grid is determined based on the intersection point at which a large correlation value is obtained. Specifically, an intersection point at which the local correlation value of the intersection point area is a maximum is selected from the four intersection points of the composition grid, and the selected intersection point is used as the size change center point of the composition grid. Since the size of the composition grid has been appropriately determined based on the initial size set as shown in FIGS. 14A and 14B, it is unnecessary to change the size of the composition grid to a large extent.

Figure 16A:
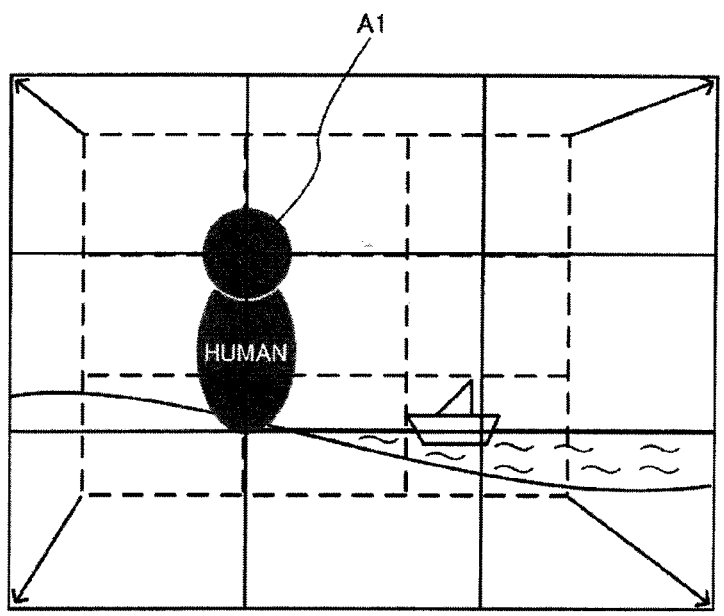
FIGS. 16A and 16B are views illustrative of a composition grid size/rotation angle update process employed in a speed-up method.

Specifically, the iterative process (steps S5, S6, and S7 in FIG. 3) calculates the composition evaluation value while changing the size of the composition grid to find the size of the composition grid at which a larger composition evaluation value is calculated. As shown in FIG. 16A, the speed-up method according to this embodiment changes the size of the composition grid with respect to the size change center point that is the intersection point (A1) of the composition grid at which the correlation value of the weighted image and the composition grid becomes a maximum. Specifically, the size of the composition grid is changed with respect to the size change center point that is the intersection point positioned within the center area of the human face to find the size of the composition grid at which a larger composition evaluation value is calculated, for example. This makes it possible to reduce the number of times that the iterative process is performed as compared with the method that performs the iterative process (steps S5, S6, and S7 in FIG. 3) while thoroughly changing the size of the composition grid, so that the process efficiency can be increased.

In a step S63 in FIG. 15, the rotation angle of the composition grid is determined based on the intersection point at which a large correlation value is obtained. Specifically, an intersection point at which the local correlation value of the intersection point area is a maximum is selected from the four intersection points of the composition grid, and the selected intersection point is used as the rotation center point of the composition grid. In this case, since the input image is not normally tilted to a large extent, it suffices to change the rotation angle by only several degrees.

Figure 16B:
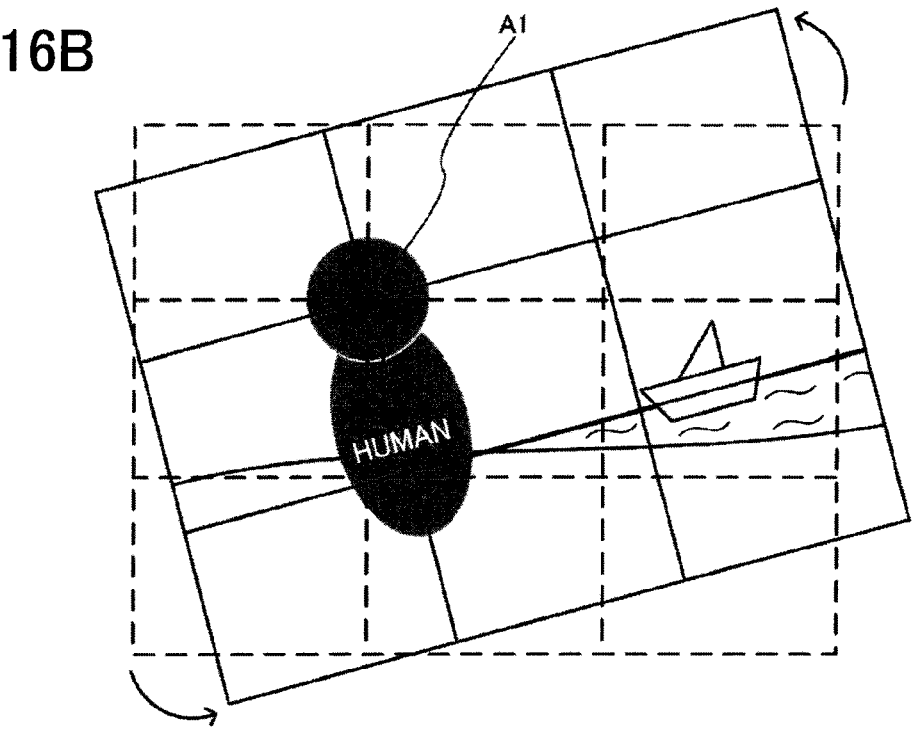

Specifically, the iterative process (steps S5, S6, and S7 in FIG. 3) calculates the composition evaluation value while changing the rotation angle of the composition grid to find the rotation angle of the composition grid at which a larger composition evaluation value is calculated. As shown in FIG. 16B, the speed-up method according to this embodiment rotates the composition grid around the rotation center point that is the intersection point (A1) of the composition grid at which the correlation value of the weighted image and the composition grid becomes a maximum. Specifically, the rotation angle of the composition grid is changed around the rotation center point that is the intersection point positioned within the center area of the human face to find the rotation angle of the composition grid at which a larger composition evaluation value is calculated, for example. This makes it possible to reduce the number of times that the iterative process is performed as compared with the method that performs the iterative process (steps S5, S6, and S7 in FIG. 3) while thoroughly changing the rotation angle of the composition grid, so that the process efficiency can be increased.

The method that updates the condition (position/size/rotation angle) of the composition grid has been described above. Note that these processes need not necessarily be performed in the order shown in the flowchart described in connection with this embodiment. When one of the conditions has been determined to be the update target, it is desirable to repeatedly calculate the composition evaluation value without changing the remaining conditions.

2.6 Overlapping Process

When determining the ideal composition from the input image, the ideal composition may be determined from a single frame image that has been input, but may also be determined by overlapping a plurality of frame images (first to nth frame images) that have been input (overlapping process), and performing the composition evaluation calculations using the resulting overlapping image. The overlapping process is described in detail below.

Figure 17C:
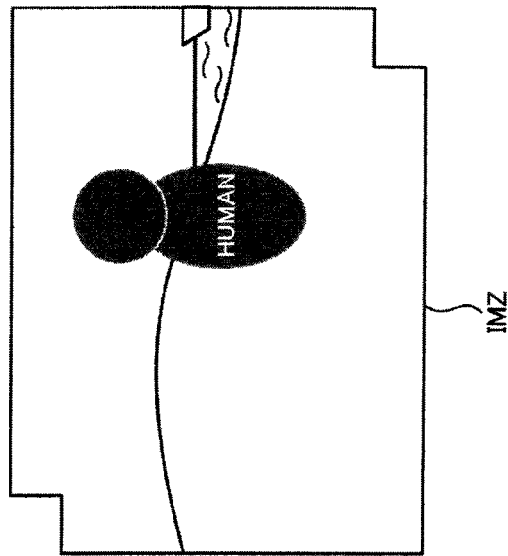
FIGS. 17A to 17C are views illustrative of an overlapping process.
Figure 17B:
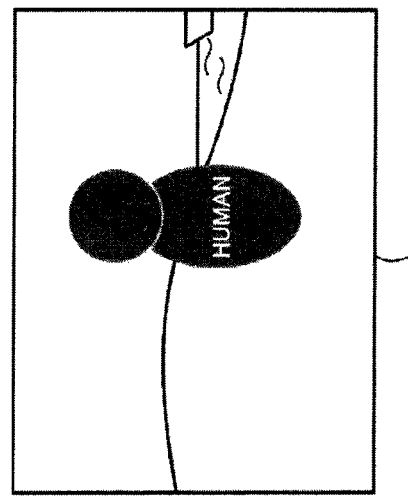
Figure 17A:
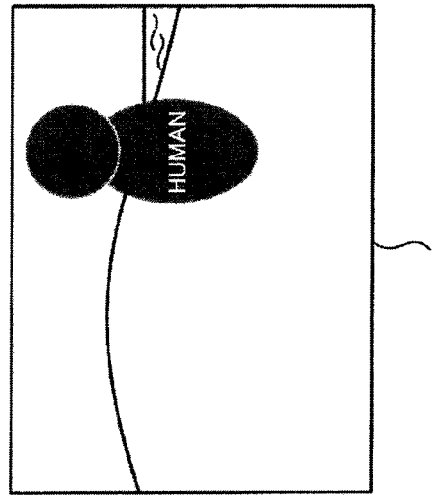

For example, when overlapping a first frame image IM1 (IMOB) and a second frame image IM2 (IM1) that have been input when the user points his camera at the object, an overlapping image that includes a wide range of objects as compared with a single frame image (see-through image) due to the movement of the camera between the frame 1 and the frame 2, is acquired. FIG. 17 shows such a situation.

In FIG. 17, an image area (i.e., angle of view) that is positioned within a single frame image (see-through image) when the user points his camera at the object (human) is indicated by the rectangular area of the first frame image IM1 and the second frame image IM2, for example. FIG. 17 also shows an overlapping image IMZ obtained by overlapping the first frame image IM1 and the second frame image IM2. As shown in FIG. 17, the overlapping image IMZ has an image area wider than that of a single frame image.

Figure 18:
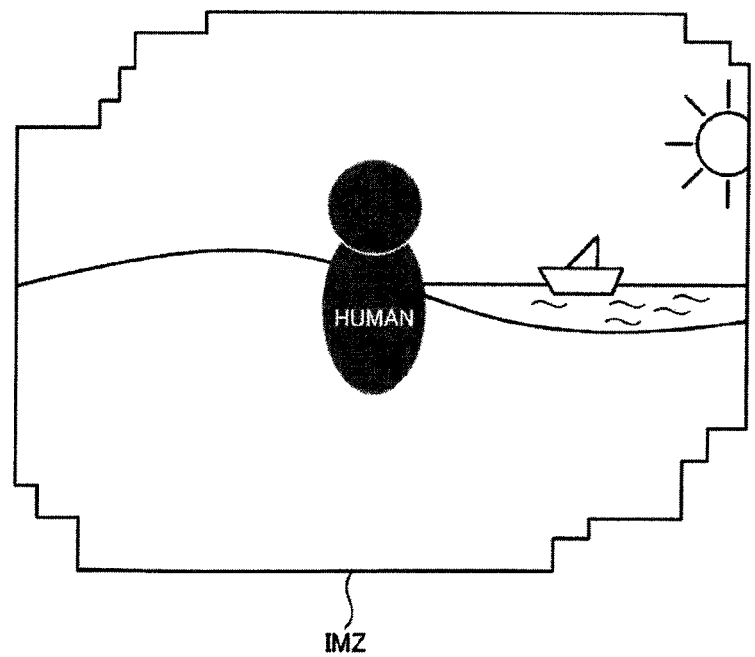
FIG. 18 shows an example of an overlapping image.

The final overlapping image IMZ shown in FIG. 18 is obtained by overlapping the first frame image IM1 to the nth frame image IMn. The user holds the camera, and moves the camera forward, backward, rightward, and leftward or upward, downward, rightward, and leftward to find the ideal composition. Therefore, the overlapping image IMZ shown in FIG. 18 is an image that reflects an angle of view wider than the angle of view of the camera.

Figure 19:
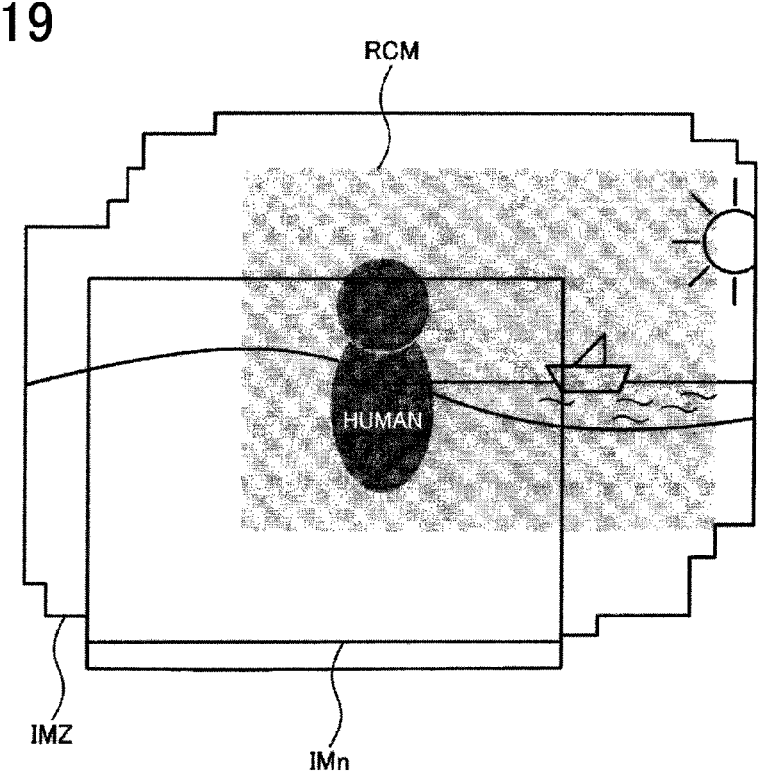
FIG. 19 is a view illustrative of a process that determines the composition from an overlapping image.

In this embodiment, the ideal composition (composition candidate) is determined based on the overlapping image IMZ thus obtained. As shown in FIG. 19, an ideal composition RCM (composition area) is determined based on the overlapping image IMZ that has an image area wider than that of the frame image, for example. Specifically, the composition evaluation calculations are performed based on the overlapping image IMZ shown in FIG. 18 and the composition grid described with reference to FIGS. 7A to 7C to calculate the composition evaluation value. For example, the ideal composition RCM shown in FIG. 19 is determined from the position/size/rotation angle of the composition grid at which the composition evaluation value becomes a maximum. An indication image that notifies the user that the composition RCM is an optimum composition is then generated. Specifically, the indication image is generated so that the color/brightness/texture of the area of the composition RCM (composition candidate area) is changed, or an arrow that indicates the position of the composition RCM is displayed.

The indication image is displayed on a display section included in the camera or the like so that the user is notified of the position of the ideal composition. The user who has observed the indication image moves the camera or performs a zoom operation so that the presented composition is achieved, and presses the shutter release button. This makes it possible for the user to photograph an image with the ideal composition even if the desirable composition range is positioned outside the angle of view of the camera.

Figure 20:
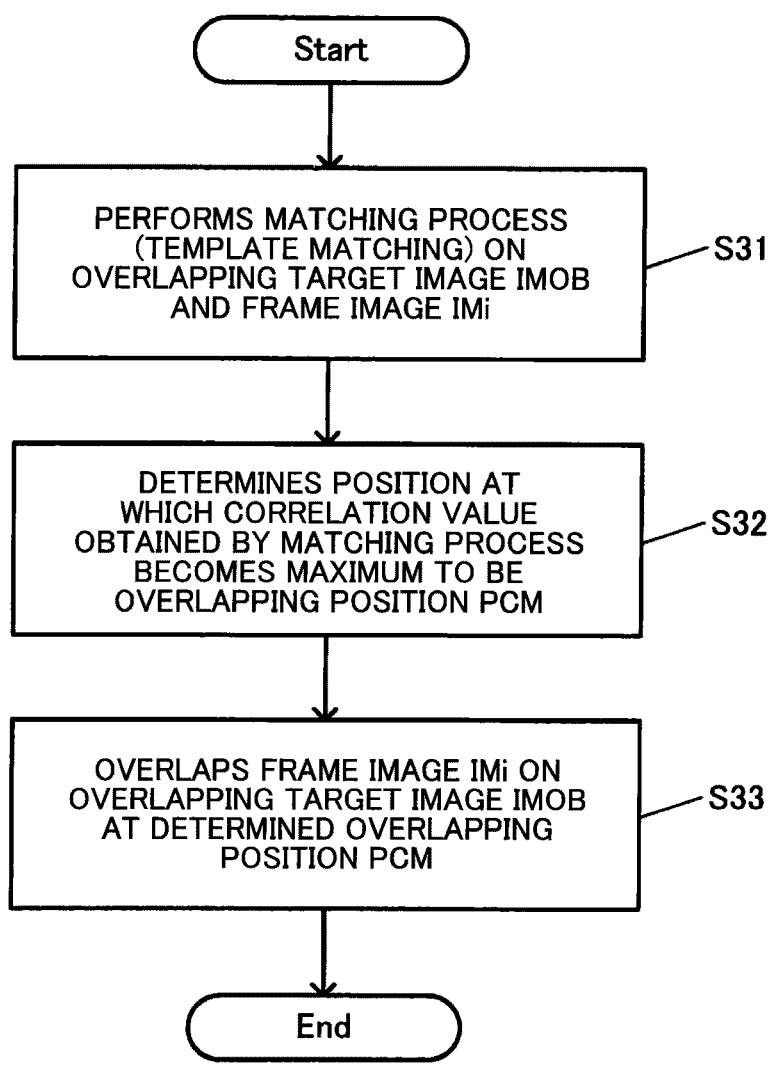
FIG. 20 is a flowchart illustrative of an overlapping process.
Figure 21:
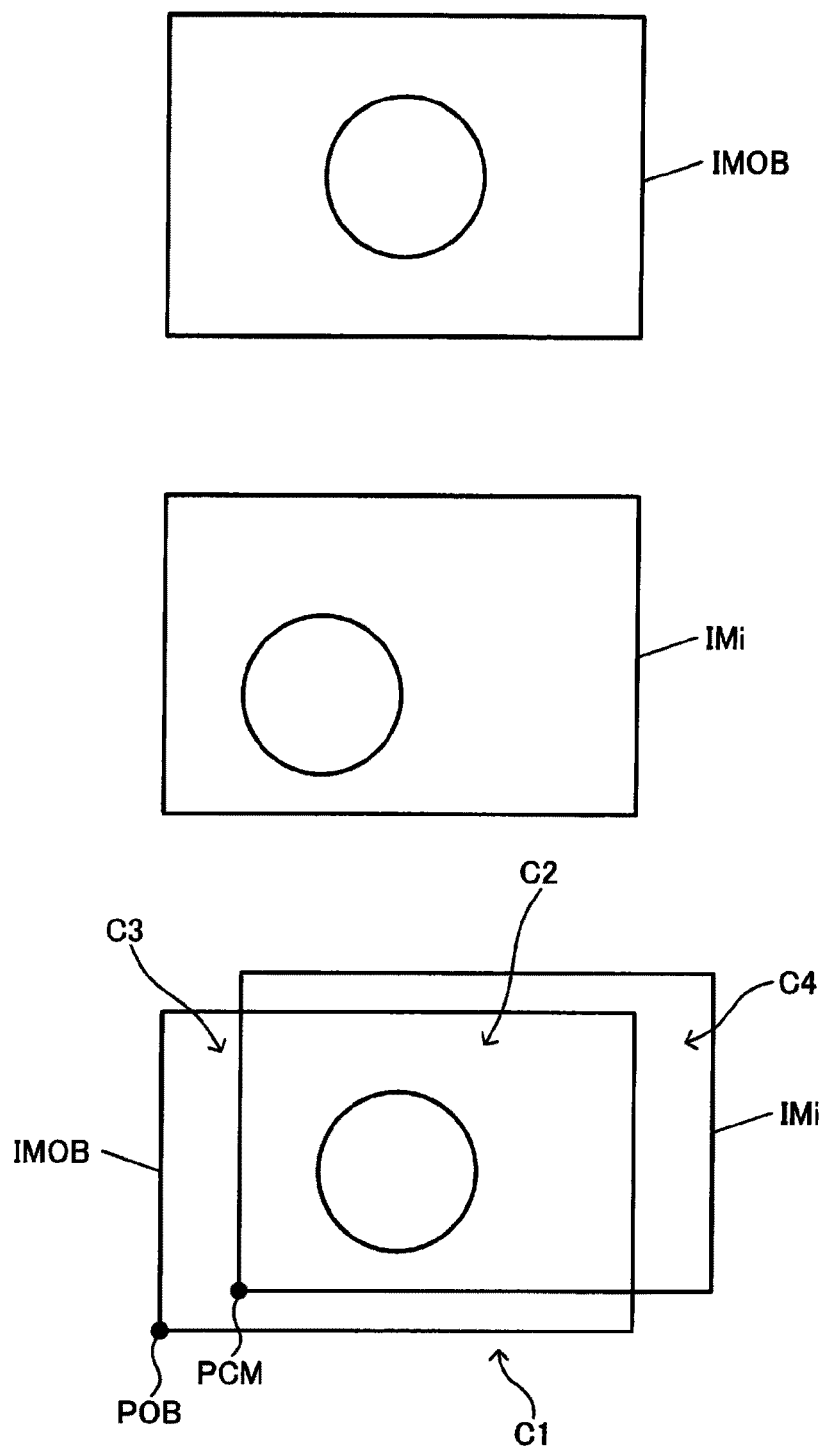
FIG. 21 is a view illustrative of an overlapping process.

FIG. 20 is a flowchart showing an example of the overlapping process. A matching process (template matching) is performed on the overlapping target image IMOB and the frame image IMi (step S31). As shown in FIG. 21, the matching process is performed while sequentially shifting the position of the frame image IMi in the X coordinate direction and the Y coordinate direction with respect to the position of the overlapping target image IMOB to calculate a correlation value, for example. The correlation value is calculated using an SSD or the like.

The position at which the correlation value obtained by the matching process becomes a maximum is determined to be an overlapping position PCM (step S32). In FIG. 21, the correlation value becomes a maximum when the images IMOB and IMi have a positional relationship indicated by C1, and the position (i.e., the position of the representative point) of the image IMi is determined to be the overlapping position PCM. The image IMi is overlapped on the image IMOB at the determined overlapping position PCM (step S33). Specifically, the pixel value of the image IMOB or IMi is set in an area where the images IMOB and IMi are present (i.e., an area having the same or similar pixel value) (see C2 in FIG. 21). The pixel value of the image IMOB is set in an area where only the image IMOB is present (see C3), and the pixel value of the image IMi is set in an area where only the image IMi is present (see C4).

The images IMOB and IMi can be overlapped without reducing the resolution by implementing the overlapping process using the above matching process.

Note that the overlapping target image IMOB and the frame image IMi used for the matching process need not necessarily have the same resolution. For example, when the user has performed the zoom operation of the camera so that the magnification has been doubled during a period from when the preceding frame image IMi-1 has been acquired (photographed) until the current frame image IMi is acquired, the matching process may be performed on the overlapping target image IMOB and an image obtained by halving the resolution of the frame image IMi, and the image IMi with a reduced resolution may be overlapped on the image IMOB.

The overlapping method according to this embodiment is not limited to the method shown in FIG. 20. Various other methods may also be employed. For example, a face area may be detected from the overlapping target image IMOB and the frame image IMi, and weighted images may be generated so that a high weight (large weighting value) is applied to the face area. The matching process may be performed on these weighted images to determine the overlapping position.

2.7 Method of Setting Object of Interest

Figure 22:
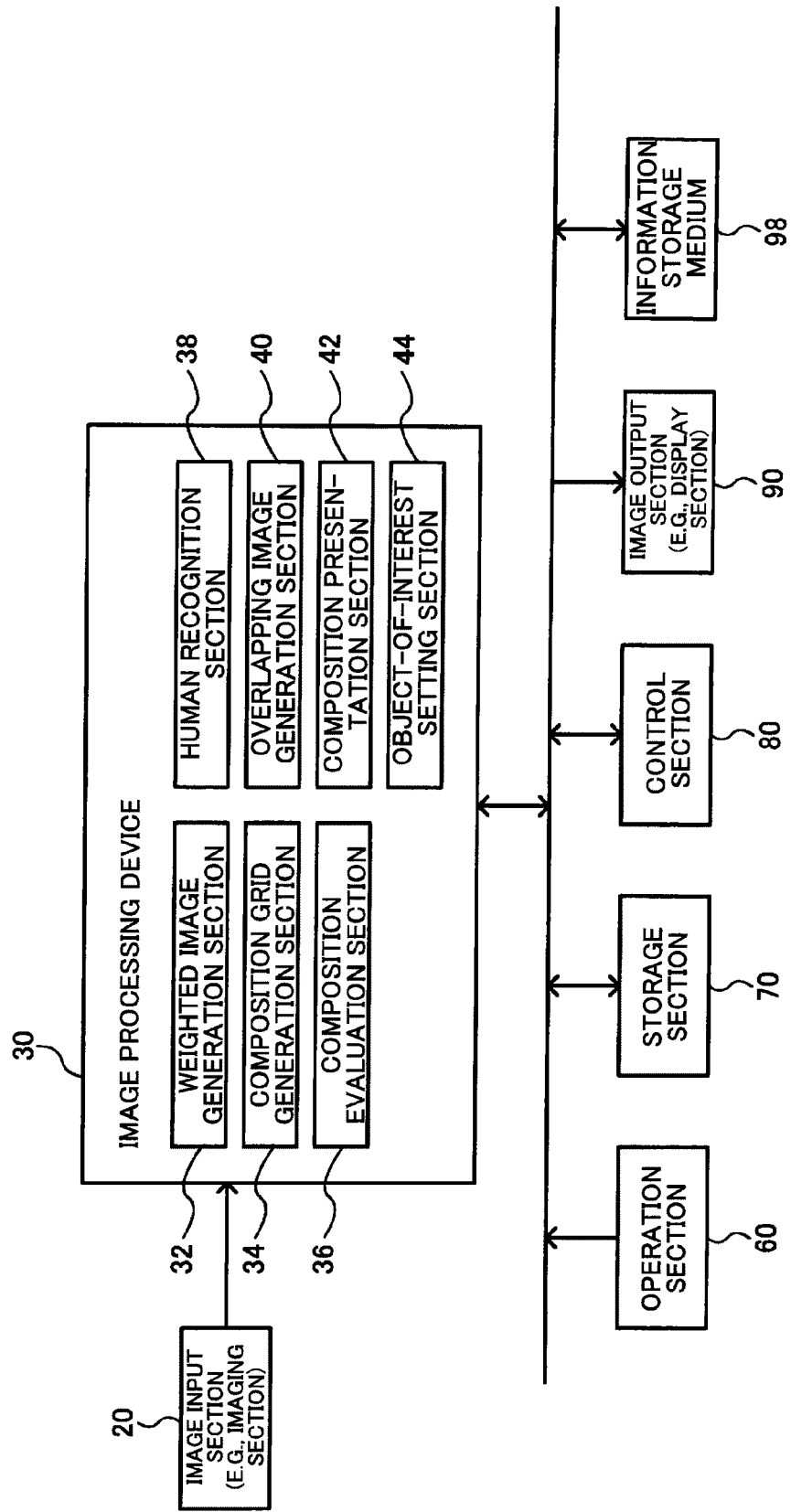
FIG. 22 shows a second configuration example of an image processing device and an electronic instrument according to one embodiment of the invention.

A method that allows the user to arbitrarily select an object of interest and presents an ideal composition that takes account of the object of interest is described below. FIG. 22 shows a second configuration example of the image processing device 30, etc. according to this embodiment that implements this method. FIG. 22 differs from FIG. 2 in that the image processing device 30 further includes an object-of-interest setting section 44.

Specifically, the user sets the desired object of interest using the operation section 60. The operation section 60 is a user interface for operating the electronic instrument (e.g., camera). The user sets the object of interest by operating a dial key button or a touch panel, speaking, or the like.

The object-of-interest setting section 44 shown in FIG. 22 performs a process that allows the user to set the object of interest. The weighted image generation section 32 generates the weighted image in which the area of the object of interest (e.g., an animal (e.g., dog or cat) or a specific person among a plurality of persons) that has been set by the user is weighted higher than the area of another object (e.g., another person) or a background (e.g., background object). The composition evaluation section 36 performs the composition evaluation calculations based on the weighted image thus generated and the composition grid generated by the composition grid generation section 34 to calculate the composition evaluation value, and determines the ideal composition.

Figure 23:
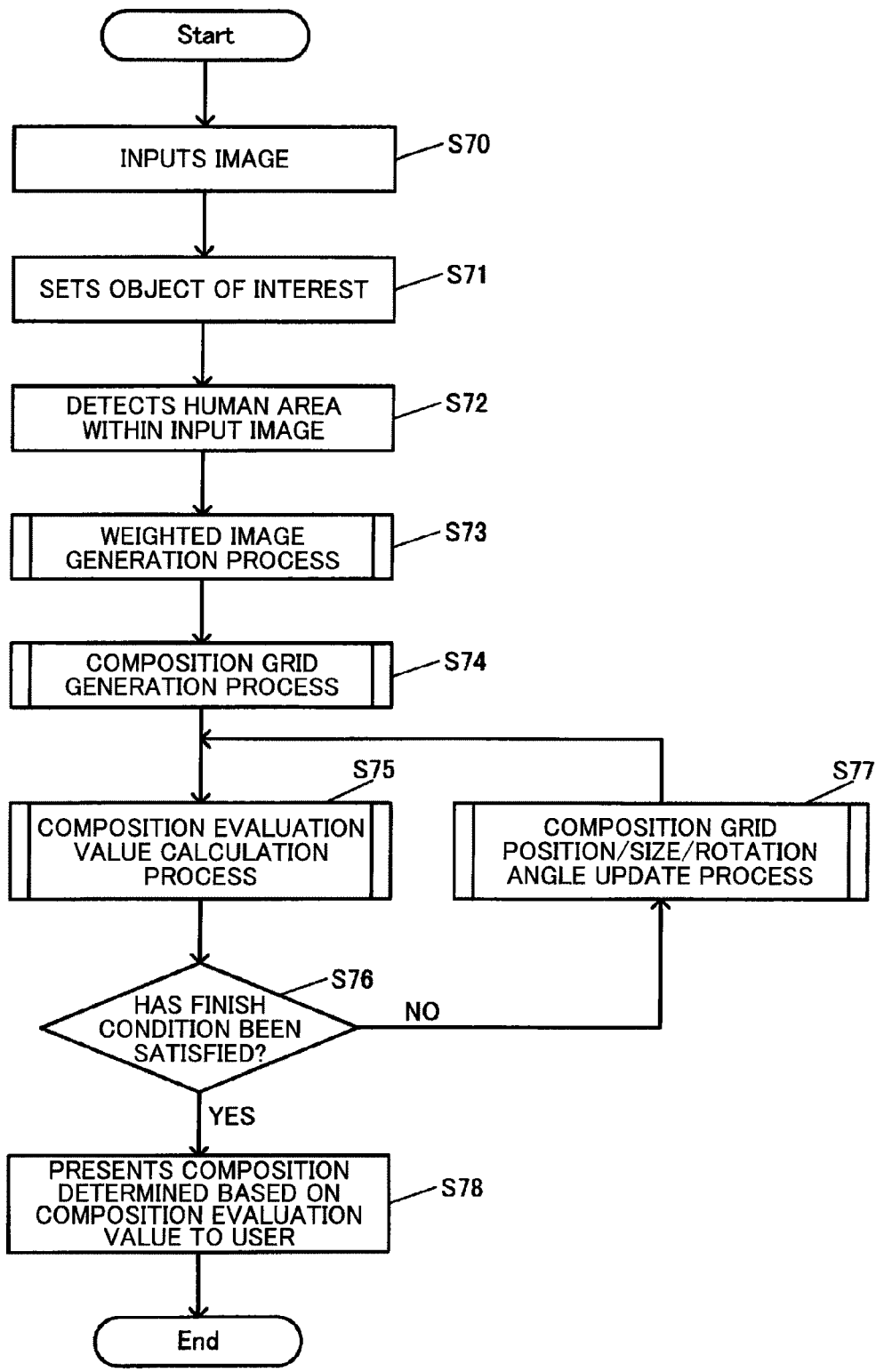
FIG. 23 is a flowchart illustrative of a process of a second configuration example according to one embodiment of the invention.

FIG. 23 is a flowchart illustrative of the process of the second configuration example. An image is input in a step S70, and an object of interest is set in a step S71. Specifically, the user sets an object of interest within the current angle of view range by operating the camera using the operation section 60. The term "object of interest" refers to an object to which the user attaches importance when obtaining an ideal composition. The object of interest may be an article, an animal, a specific person among a plurality of persons, or the like. The user may set two or more objects of interest, as desired. A point on the image, a rectangular or elliptical range, or the like may be designated as the area of the object of interest.

In a step S72 in FIG. 23, a human area within the image is detected. In a weighted image generation process in a step S73, the human area is weighted as described with reference to FIG. 5B. The area of the object of interest set in the step S71 is weighted in the same manner as the human area. In this case, the area of the object of interest designated by the user is weighted higher than the human area detected in the step S72.

According to this configuration, when the user attaches importance to his dog as the object, the user can take a photograph in which the dog is situated in an optimum composition as compared with a person positioned near the dog, for example. Alternatively, when the user attaches importance to a background object (e.g., mountain) as the object, the user can take a photograph in which the background object is situated in an optimum composition even if a person happens to be positioned within the angle of view range. The processes of steps S74 to S78 are the same as those of the steps S4 to S8 in FIG. 3. Therefore, description thereof is omitted.

According to the second configuration example, it is possible to obtain an ideal composition that takes account of the object of interest that is arbitrarily set by the user.

2.8 Display of Composition Evaluation Calculation Result

A method that presents the result of the composition evaluation calculations (i.e., the ideality of the composition) when presenting the ideal composition to the user is described below.

Figure 24A:
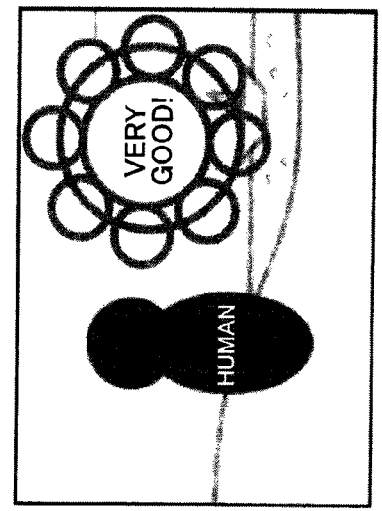
FIGS. 24A to 24C are views illustrative of a composition evaluation calculation result presentation method.
Figure 24B:
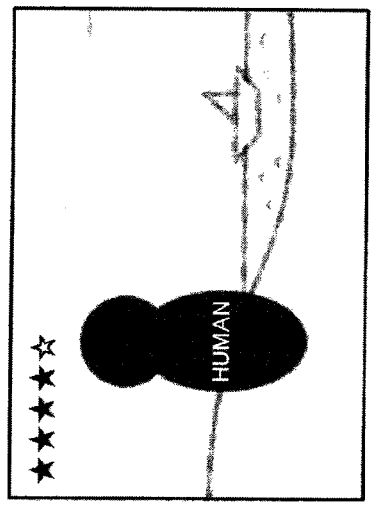
Figure 24C:
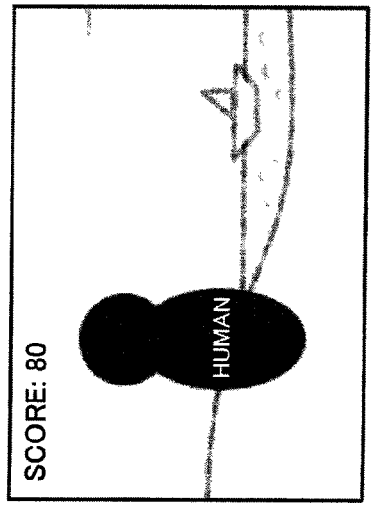

In the step S8 in FIG. 3, the ideal composition determined based on the composition evaluation value is presented to the user, for example. In this case, the result of the composition evaluation calculations is also presented to the user. FIGS. 24A and 24C show examples of this method.

In FIG. 24A, the result of the composition evaluation calculations is presented to the user using a score (character in a broad sense). Since the result of the composition evaluation calculations is obtained as the composition evaluation value (i.e., numerical value), a conversion table that specifies the relationship between the ideality of the composition and the score is stored in advance in the storage section 70 shown in FIG. 2. The score can be determined from the composition evaluation value using the conversion table, and presented to the user, as shown in FIG. 24A.

The result of the composition evaluation calculations may also be presented to the user using a graph or an image effect instead of a character (e.g., score) shown in FIG. 24A. FIG. 24B shows a presentation example using a graph, and FIG. 24C shows a presentation example using an image effect.

The user can visually determine the ideality of the composition calculated by the composition evaluation calculations based on a character, a graph, or an image effect by employing the method shown in FIGS. 24A to 24C. This makes it possible to provide the user with a novel interface environment.

An example in which the result of the composition evaluation calculations is displayed after finding the ideal composition by the composition evaluation calculations has been described above. Note that the composition evaluation value of the entire input image may be calculated and presented to the user. In this case, the result of the composition evaluation calculations on the current see-through image acquired by the camera or the entire image photographed by the user is presented to the user. Therefore, the user can check the ideality of the image while moving the camera, for example.

For example, when the user has set the camera to a composition evaluation mode and half-pressed the shutter release button of the camera, a composition grid having the same size as the frame image of the see-through image is generated. The composition evaluation calculations are performed on the frame image of the see-through image and the composition grid, and the result of the composition evaluation calculations is presented to the user in real time using the presentation method shown in FIGS. 24A to 24C, for example. The user can take a photograph with an ideal composition by pressing the shutter release button when a satisfying composition evaluation result has been obtained.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., human and composition evaluation value calculation process) cited with a different term (e.g., object of interest and composition evaluation calculations) having a broader meaning or the same meaning at least once in the specification and the drawings can be replaced by the different term in any place in the specification and the drawings. The configurations and the operations of the image processing device and the electronic instrument are not limited to those described in connection with the above embodiments. Various modifications and variations may be made.

What is claimed is:

1. An image processing device that evaluates a composition of an input image, the image processing device comprising:
a weighted image generation section that generates a weighted image in which at least one of an object-of-interest area of the input image and an edge of a background area other than the object-of-interest area is weighted;
a composition grid generation section that generates a composition grid that includes grid lines, the grid lines being weighted; and
a composition evaluation section that performs composition evaluation calculations on the input image based on the weighted image and the composition grid;
wherein the composition evaluation section calculates a composition evaluation value using a weight applied to an intersection point of the composition grid, and recalculates the composition evaluation value using a weight applied to the grid line if the calculated composition evaluation value using the weight applied to the intersection point of the composition grid is equal to or larger than a given threshold value.

2. The image processing device as defined in claim 1, wherein the composition evaluation section performs correlation calculations on the weighted image and the composition grid to calculate the composition evaluation value.

3. The image processing device as defined in claim 1, wherein the weighted image generation section generates the weighted image such that the object-of-interest area is weighted higher than the edge of the background area.

4. The image processing device as defined in claim 1, wherein the weighted image generation section generates the weighted image such that a human face area is weighted higher than a human body area when a human has been detected within the input image.

5. The image processing device as defined in claim 1, wherein the weighted image generation section generates the weighted image such that a higher weight is applied to an area that is positioned closer to a center area of the object-of-interest area.

6. The image processing device as defined in claim 1, wherein the weighted image generation section extracts an edge of the input image, and smooths the extracted edge to generate the weighted image.

7. The image processing device as defined in claim 1, wherein the composition grid generation section generates the composition grid such that a higher weight is applied to an area that is positioned closer to the grid line.

8. The image processing device as defined in claim 1, wherein the composition grid generation section generates the composition grid such that the intersection point of the composition grid is weighted higher than the grid line excluding the intersection point.

9. The image processing device as defined in claim 1, wherein the composition evaluation section sets one of a plurality of intersection points of the composition grid within a center area of a human face area when the human face area has been detected within the input image, and calculates the composition evaluation value.

10. The image processing device as defined in claim 1, wherein when a human face area has been detected within the input image, the composition evaluation section sets a size of the composition grid based on a size of the human face area.

11. The image processing device as defined in claim 1, further comprising:
an overlapping image generation section that overlaps first to nth frame images that have been input to generate an overlapping image,
wherein the composition evaluation section performs correlation calculations on the weighted image, which is generated from the overlapping image, and the composition grid.

12. The image processing device as defined in claim 1, further comprising:
an object-of-interest setting section that allows a user to set an object of interest,
wherein the weighted image generation section generates the weighted image such that an area of the object of interest that has been set by the user is weighted higher than an area of another object or a background.

13. The image processing device as defined in claim 1, further comprising:
a composition presentation section that determines a composition of the input image based on a result of the composition evaluation calculations using the weighted image and the composition grid, and presents the determined composition to a user.

14. The image processing device as defined in claim 13, wherein the composition presentation section presents the result of the composition evaluation calculations using the weighted image and the composition grid to the user using at least one of a character, a graph, and an image effect.

15. An electronic instrument comprising the image processing device as defined in claim 1.

16. An image processing device that evaluates a composition of an input image, the image processing device comprising:
a weighted image generation section that generates a weighted image in which at least one of an object-of-interest area of the input image and an edge of a background area other than the object-of-interest area is weighted;
a composition grid generation section that generates a composition grid that includes grid lines, the grid lines being weighted; and
a composition evaluation section that performs composition evaluation calculations on the input image based on the weighted image and the composition grid;
wherein the composition evaluation section calculates a composition evaluation value using a weight applied to the grid line, and recalculates the composition evaluation value using a weight applied to a peripheral area of the grid line if the calculated composition evaluation value using the weight applied to the grid line is equal to or larger than a given threshold value.

17. An image processing device that evaluates a composition of an input image, the image processing device comprising:
a weighted image generation section that generates a weighted image in which at least one of an object-of-interest area of the input image and an edge of a background area other than the object-of-interest area is weighted;
a composition grid generation section that generates a composition grid that includes grid lines, the grid lines being weighted; and
a composition evaluation section that performs composition evaluation calculations on the input image based on the weighted image and the composition grid;
wherein the composition evaluation section calculates a composition evaluation value while changing a size of the composition grid to find a size of the composition grid at which a larger composition evaluation value is calculated; and
wherein the composition evaluation section determines an intersection point of the composition grid at which a correlation value of the weighted image and the composition grid becomes a maximum to be a size change center point from a plurality of intersection points of the composition grid, and changes the size of the composition grid with respect to the size change center point to find the size of the composition grid at which the larger composition evaluation value is calculated.

18. An image processing device that evaluates a composition of an input image, the image processing device comprising:
a weighted image generation section that generates a weighted image in which at least one of an object-of-interest area of the input image and an edge of a background area other than the object-of-interest area is weighted;
a composition grid generation section that generates a composition grid that includes grid lines, the grid lines being weighted; and
a composition evaluation section that performs composition evaluation calculations on the input image based on the weighted image and the composition grid;
wherein the composition evaluation section calculates a composition evaluation value while rotating the composition grid to find a rotation angle of the composition grid at which a larger composition evaluation value is calculated; and
wherein the composition evaluation section determines an intersection point of the composition grid at which a correlation value of the weighted image and the composition grid becomes a maximum to be a rotation center point from a plurality of intersection points of the composition grid, and rotates the composition grid around the rotation center point to find the rotation angle of the composition grid at which the larger composition evaluation value is calculated.

19. A non-transitory computer-readable information storage medium having stored thereon a program that is executable by a computer to cause the computer to function as:
a weighted image generation section that generates a weighted image in which at least one of an object-ofinterest area of an input image and an edge of a background area other than the object-of-interest area is weighted;

a composition grid generation section that generates a composition grid that includes grid lines, the grid lines being weighted; and a composition evaluation section that performs composition evaluation calculations on the input image based on the weighted image and the composition grid;

wherein the composition evaluation section calculates a composition evaluation value using a weight applied to an intersection point of the composition grid, and recalculates the composition evaluation value using a weight applied to the grid line if the calculated composition evaluation value using the weight applied to the intersection point of the composition grid is equal to or larger than a given threshold value.

20. A non-transitory computer-readable information storage medium having stored thereon a program that is executable by a computer to cause the computer to function as:

a weighted image generation section that generates a weighted image in which at least one of an object-of-interest area of an input image and an edge of a background area other than the object-of-interest area is weighted;

a composition grid generation section that generates a composition grid that includes grid lines, the grid lines being weighted; and a composition evaluation section that performs composition evaluation calculations on the input image based on the weighted image and the composition grid;

wherein the composition evaluation section calculates a composition evaluation value using a weight applied to the grid line, and recalculates the composition evaluation value using a weight applied to a peripheral area of the grid line if the calculated composition evaluation value using the weight applied to the grid line is equal to or larger than a given threshold value.

21. A non-transitory computer-readable information storage medium having stored thereon a program that is executable by a computer to cause the computer to function as:

a weighted image generation section that generates a weighted image in which at least one of an object-of-interest area of an input image and an edge of a background area other than the object-of-interest area is weighted;

a composition grid generation section that generates a composition grid that includes grid lines, the grid lines being weighted; and a composition evaluation section that performs composition evaluation calculations on the input image based on the weighted image and the composition grid;

wherein the composition evaluation section calculates a composition evaluation value while changing a size of the composition grid to find a size of the composition grid at which a larger composition evaluation value is calculated;

wherein the composition evaluation section determines an intersection point of the composition grid at which a correlation value of the weighted image and the composition grid becomes a maximum to be a rotation center point from a plurality of intersection points of the composition grid, and rotates the composition grid around the rotation center point to find the rotation angle of the composition grid at which the larger composition evaluation value is calculated.

22. A non-transitory computer-readable information storage medium having stored thereon a program that is executable by a computer to cause the computer to function as:

a weighted image generation section that generates a weighted image in which at least one of an object-of-interest area of an input image and an edge of a background area other than the object-of-interest area is weighted;

a composition grid generation section that generates a composition grid that includes grid lines, the grid lines being weighted; and a composition evaluation section that performs composition evaluation calculations on the input image based on the weighted image and the composition grid, wherein the composition evaluation section calculates a composition evaluation value while rotating the composition grid to find a rotation angle of the composition grid at which a larger composition evaluation value is calculated;

wherein the composition evaluation section determines an intersection point of the composition grid at which a correlation value of the weighted image and the composition grid becomes a maximum to be a rotation center point from a plurality of intersection points of the composition grid, and rotates the composition grid around the rotation center point to find the rotation angle of the composition grid at which the larger composition evaluation value is calculated.

* * * * *